United States Patent
Gilleland et al.

(10) Patent No.: US 8,971,474 B2
(45) Date of Patent: Mar. 3, 2015

(54) AUTOMATED NUCLEAR POWER REACTOR FOR LONG-TERM OPERATION

(75) Inventors: John Rogers Gilleland, Kirkland, WA (US); Roderick A. Hyde, Redmond, WA (US); Muriel Y. Ishikawa, Livermore, CA (US); Nathan P. Myhrvold, Medina, WA (US); Lowell L. Wood, Jr., Bellevue, WA (US)

(73) Assignee: TerraPower, LLC, Bellevue, WA (US)

( * ) Notice: Subject to any disclaimer, the term of this patent is extended or adjusted under 35 U.S.C. 154(b) by 518 days.

(21) Appl. No.: 12/381,899

(22) Filed: Mar. 16, 2009

(65) Prior Publication Data

US 2009/0252273 A1    Oct. 8, 2009

Related U.S. Application Data

(63) Continuation-in-part of application No. 11/605,943, filed on Nov. 28, 2006.

(51) Int. Cl.
| | |
|---|---|
| *G21C 19/00* | (2006.01) |
| *G21D 3/00* | (2006.01) |
| *G21C 1/00* | (2006.01) |
| *G21C 1/02* | (2006.01) |
| *G21C 1/30* | (2006.01) |
| *G21C 5/00* | (2006.01) |

(52) U.S. Cl.
CPC .. *G21D 3/00* (2013.01); *G21C 1/00* (2013.01); *G21C 1/026* (2013.01); *G21C 1/30* (2013.01); *G21C 5/00* (2013.01); *Y02E 30/39* (2013.01); *Y02E 30/34* (2013.01)
USPC .............................. 376/260; 376/156; 376/158

(58) Field of Classification Search
USPC ................................... 376/156, 158
See application file for complete search history.

(56) References Cited

U.S. PATENT DOCUMENTS

| | | | |
|---|---|---|---|
| 3,096,263 | A | 7/1963 | Kingston et al. |
| 3,147,191 | A | 9/1964 | Crowther |
| 3,437,847 | A | 4/1969 | Raspet |
| 3,535,562 | A | 10/1970 | Byrd |
| 3,601,638 | A | 8/1971 | Busse |
| 3,607,631 | A | 9/1971 | Hobson et al. |

(Continued)

FOREIGN PATENT DOCUMENTS

| | | |
|---|---|---|
| DE | 1539689 | 1/1970 |
| DE | 2142744 | 3/1973 |

(Continued)

OTHER PUBLICATIONS

Teller, Edward. "Nuclear Energy for the Third Millennium"; International Conference on Environment and Nuclear Energy Oct. 27-29, 1997; bearing a date of Oct. 1997; 1-14; Livermore, California.*

(Continued)

*Primary Examiner* — Timothy A Brainard

(57) ABSTRACT

Exemplary embodiments provide automated nuclear fission reactors and methods for their operation. Exemplary embodiments and aspects include, without limitation, re-use of nuclear fission fuel, alternate fuels and fuel geometries, modular fuel cores, fast fluid cooling, variable burn-up, programmable nuclear thermostats, fast flux irradiation, temperature-driven surface area/volume ratio neutron absorption, low coolant temperature cores, refueling, and the like.

3 Claims, 19 Drawing Sheets

(56) References Cited

U.S. PATENT DOCUMENTS

| | | | |
|---|---|---|---|
| 3,629,063 | A | 12/1971 | Houston |
| 3,668,070 | A | 6/1972 | Fiebelmann et al. |
| 3,732,427 | A | 5/1973 | Trudeau et al. |
| 3,854,524 | A | 12/1974 | Gregorie et al. |
| 3,960,655 | A | 6/1976 | Bohanan et al. |
| 4,072,559 | A | 2/1978 | Neidl et al. |
| 4,113,563 | A | 9/1978 | Tobin |
| 4,270,938 | A | 6/1981 | Schmidt et al. |
| T101,204 | I4 | 11/1981 | Hampel |
| 4,303,474 | A | 12/1981 | Baxi |
| 4,478,784 | A | 10/1984 | Burelbach |
| 4,508,677 | A | 4/1985 | Craig et al. |
| 4,591,479 | A | 5/1986 | Weitzberg |
| 4,604,785 | A | 8/1986 | Eddens |
| 4,617,170 | A | 10/1986 | Suchy |
| 4,636,352 | A | 1/1987 | Boyle |
| 4,749,544 | A | 6/1988 | Crowther et al. |
| 4,764,339 | A | 8/1988 | Lake et al. |
| 4,827,139 | A | 5/1989 | Wells et al. |
| 4,851,183 | A | 7/1989 | Hampel |
| 5,019,322 | A | 5/1991 | von Charzewski et al. |
| 5,039,475 | A | 8/1991 | Kennel et al. |
| 5,082,617 | A | 1/1992 | Walter et al. |
| 5,182,077 | A | 1/1993 | Feinroth |
| 5,202,084 | A | 4/1993 | Fennern et al. |
| 5,223,210 | A | 6/1993 | Hunsbedt et al. |
| 5,241,573 | A | 8/1993 | Thacker |
| 5,264,056 | A | 11/1993 | Lapides |
| 5,307,387 | A | 4/1994 | Nakajima et al. |
| 5,309,493 | A | 5/1994 | Kamimura et al. |
| 5,353,321 | A | 10/1994 | Rybnikov |
| 5,408,510 | A | 4/1995 | Ball et al. |
| 5,420,897 | A | 5/1995 | Kasai et al. |
| 5,493,592 | A | 2/1996 | Garzarolli et al. |
| 5,684,848 | A | 11/1997 | Gou et al. |
| 5,774,514 | A | 6/1998 | Rubbia |
| 6,120,706 | A | 9/2000 | Lessing et al. |
| 6,233,298 | B1 | 5/2001 | Bowman |
| 6,512,805 | B1 | 1/2003 | Takeda et al. |
| 6,768,781 | B1 | 7/2004 | Moriarty |
| 6,878,952 | B1 | 4/2005 | Ohsono et al. |
| 6,944,255 | B2 | 9/2005 | Hattori et al. |
| 2003/0174802 | A1 | 9/2003 | Hare |
| 2004/0047445 | A1 | 3/2004 | Delafoy et al. |
| 2004/0182088 | A1 | 9/2004 | Ghoshal et al. |
| 2005/0069075 | A1 | 3/2005 | D'Auvergne |
| 2006/0056572 | A1 | 3/2006 | Lecomte |
| 2006/0109944 | A1* | 5/2006 | Popa .................... 376/267 |
| 2006/0133972 | A1 | 6/2006 | Guetlhuber et al. |
| 2006/0171498 | A1 | 8/2006 | D'Auvergne |
| 2006/0227924 | A1 | 10/2006 | Hallstadius et al. |
| 2007/0092053 | A1 | 4/2007 | Sato |
| 2008/0069289 | A1 | 3/2008 | Peterson |
| 2008/0123795 | A1 | 5/2008 | Hyde et al. |
| 2008/0123796 | A1 | 5/2008 | Hyde et al. |
| 2008/0232533 | A1 | 9/2008 | Blanovsky |
| 2009/0080592 | A1 | 3/2009 | Arsenlis et al. |

FOREIGN PATENT DOCUMENTS

| | | |
|---|---|---|
| GB | 1063696 | 3/1967 |
| JP | 10-115692 | 5/1998 |
| JP | 2002-071866 A | 3/2002 |
| JP | 2002-181976 A | 6/2002 |
| JP | 2005-527808 A | 9/2005 |
| JP | 2007-232429 | 9/2007 |
| WO | WO 2009/136971 A2 | 11/2009 |
| WO | WO 2009/139899 A1 | 11/2009 |

OTHER PUBLICATIONS

Accelerator-driven Systems (ADS) and Fast Reactors (FR) in Advanced Nuclear Fuel Cycles, A Comparative Study, Nuclear Energy Agency Organisation for Economic Co-Operation and Development, 2002, pp. 43-46.*

Teller E et al: "Completely Automated Nuclear Power Reactors for Long-Term Operation. III. Enabling Technology for Large-Scale, Low-Risk Affordable Nuclear Electricity", Report Lawrence Livermore National Laboratory,No. Preprint UCRL-JRNL-122788 Nov. 30, 2003 (2803-11-38), pp. 1-59, XP889146135.*

Accelerator-driven Systems (ADS) and Fast Reactors (FR) in Advanced Nuclear Fuel Cycles, A Comparative Study, Nuclear Energy Agency Organisation for Economic Co-Operation and Development, May 2, 2002, pp. 43-46.*

International Search Report; International App. No. PCT/US2009/00765; Oct. 13, 2009; pp. 1-2.

International Search Report; International App. No. PCT/US2009/00764; Oct. 13, 2009; pp. 1-2.

International Search Report; International App. No. PCT/US2009/00763; Oct. 5, 2009; pp. 1-2.

Teller, Edward. "Nuclear Energy for the Third Millenium"; International Conference on Environment and Nuclear Energy Oct. 27-29, 1997; bearing a date of Oct. 1997; 1-14; Livermore, California.

Akhiezer, A. I.; Khizhnyak, N. A.; Shulga, N. F.; Pilipenko, V. V.; and Davydov, L. N.; "Slow Nuclear Burning"; Problems of Atomic Science and Technology; 2001; pp. 272-275; vol. 6.

Atefi, B.; Driscoll, M. J.; and Lanning, D. D.; "An Evaluation of the Breed/Burn Fast Reactor Concept"; Massachusetts Institute of Technology, Department of Nuclear Engineering; Dec. 1979; pp. 1-295.

Feinberg, S. M.; "Discussion Comment"; Rec. of Proc. Session B-10 of the ICPUAE; Sep. 10, 1958; p. 447-449; No. 2, vol. 9; Geneva, Switzerland.

Feoktistov, L. P.; "An Analysis of a Concept of a Physically Safe Reactor"; Preprint IAE-4605/4; Moscow: IAE; 1988; pp. 1-9; in Russian.

Feoktistov, L. P.; "Neutron-Fissioning Wave"; Dokl. Akad. Nauk SSSR; 1989; pp. 864-867; in Russian.

Fomin, S. P.; Mel'Nik, Yu. P.; Pilipenko, V. V.; and Shul'Ga, N. F.; "Study of Self-Organizing Regime of Nuclear Burning Wave in Fast Reactor"; Problems of Atomic Science and Technology; 2005; pp. 106-113, No. 6.

Ohoka, Y.; and Sekimoto, H.; "Application of CANDLE Burnup to Block-Type High Temperature Gas Cooled Reactor"; Nuclear Engineering and Design; 2004; pp. 15-23; vol. 229; Elsevier B. V.

Sekimoto, Hiroshi; "Application of CANDLE Burnup Strategy for Future Nuclear Energy Utilization"; Progress in Nuclear Energy; 2005; pp. 91-98; vol. 47; No. 1-4; Elsevier Ltd.; Great Britain.

Sekimoto, Hiroshi; "Fuel-Cycle of CANDLE Burnup with Depleted Uranium"; Proc. of ICAPP 2005; May 15-19, 2005; Seoul, Korea.

Sekimoto, Hiroshi; "Fuel-Cycle of CANDLE Burnup with Depleted Uranium"; Proc. of ICAPP 2006; Jun. 4-8, 2006, Reno, Nevada; pp. 1908-1914; American Nuclear Society; LaGrange Park, IL.

Sekimoto, Hiroshi and Ryu, Kouichi; "A New Reactor Burnup Concept 'CANDLE'"; Proc. of PHYSOR2000; May 7-11, 2000; pp. 1-9; Pittsburgh, PA.

Sekimoto, Hiroshi; Ryu, Kouichi; and Yoshimura, Yoshikane; "CANDLE: The New Burnup Strategy"; Nuclear Science and Engineering; 2001; pp. 306-317; vol. 139.

Sekimoto, Hiroshi and Tanaka, Kohtaro; "Candle Burnup for Different Cores"; Proc. of PHYSOR 2002: International Conference on the New Frontiers of Nuclear Technology: Reactor Physics, Safety and High-Performance Computing; Oct. 7-10, 2002; pp. 1-12; Seoul, Korea.

Sekimoto, Hiroshi; Toshinsky, V.; and Ryu, K.; "Natural Uranium Utilization without Enrichment and Reprocessing"; Proc. of Global 2001; Sep. 9-13, 2001; pp. 1-3; Paris, France.

Soentono, Soedyartomo; "Nuclear Power Development in Indonesia"; Proc. of Energy Future and the Nuclear Fuel Cycle in the Asia/Pacific Region, 19th Annual Conference Industrial Liaison Program; pp. 51-61; Mar. 12, 1997.

Toshinsky, Georgy I.; "LMFBR Operation in the Nuclear Cycle Without Fuel Reprocessing"; Proceedings of the International Topical Meeting on Advanced Reactors Safety (ARS '97); Jun. 1-5, 1997; pp. 39-44; vol. I; Orlando, FL.

Toshinsky, Vladimir G.; Sekimoto, Hiroshi; and Toshinsky, Georgy I.; "Multiobjective Fuel Management Optimization for Self-Fuel-Providing LMFBR Using Genetic Algorithms"; Annals of Nuclear Energy; 1999; pp. 783-802; vol. 26; Elsevier Science Ltd.

(56) References Cited

OTHER PUBLICATIONS

Van Dam, Hugo; "The Self-Stabilizing Criticality Wave Reactor"; Proc. of the Tenth International Conference on Emerging Nuclear Energy Systems (ICENES 2000); 2000; pp. 009.1-009.10; Petten, Netherlands.

Yarsky, P.; Driscoll, M. J.; and Hejzlar, P.; "Integrated Design of a Breed and Burn Gas-Cooled Fast Reactor Core"; The MIT Center for Advanced Nuclear Energy Systems (CANES); Document No. MIT-ANP-TR-107; Sep. 2005; pp. 1-253.

PCT International Search Report; International App. No. PCT/US2009/04512; Dec. 7, 2009; pp. 1-2.

Hyde, Roderick; Ishikawa, Muriel; Myhrvold, Nathan; Nuckolls, John; Wood, Lowell; "Nuclear Fission Power for $21^{st}$ Century Needs: Enabling Technologies for Large-Scale, Low-Risk, Affordable Nuclear Electricity" [Abstract]; pp. 1.

PCT International Search Report; International App. No. PCT/US2007/024392; Oct. 7, 2008; pp. 1-4.

PCT International Search Report; International App. No. PCT/US2007/024445; Aug. 26, 2008; pp. 1-2.

PCT International Search Report; International App. No. PCT/US2007/024375; Oct. 7, 2008; pp. 1-4.

Teller, Edward; Ishikawa, Muriel; Wood, Lowell; "Completely Automated Nuclear Reactors for Long-Term Operation"; "Frontiers in Physics Symposium"; bearing dates of Oct. 26-28, 1995 and Jan. 1996; pp. 1-13; Lawrence Livermore National Laboratory; Livermore, California.

Teller, Edward; Ishikawa, Muriel; Wood, Lowell; Hyde, Roderick; Nuckolls, John; "Completely Automated Nuclear Power Reactors for Long-Term Operation: III. Enabling Technology for Large-Scale, Low-Risk, Affordable Nuclear Electricity"; pp. 1-57; University of California Lawrence Livermore National Laboratory; Livermore, California.

Teller, Edward; Ishikawa, Muriel; Wood, Lowell; Hyde, Roderick; Nuckolls, John; "Completely Automated Nuclear Reactors for Long-Term Operation II: Toward a Concept-Level Point-Design of a High-Temperature, Gas-Cooled Central Power Station"; 1996 International Conference on Emerging Nuclear Energy Systems; bearing dates of Jun. 20, 1996 and Jun. 24-28, 1996; pp. 1-44; Lawrence Livermore National Laboratory; Livermore, California.

Teller, Edward; Wood, Lowell; Nuckolls, John; Ishikawa, Muriel; Hyde, Roderick; "Problem-Free Nuclear Power and Global Change"; $22^{nd}$ International Symposium on Planetary Emergencies; bearing dates of Aug. 15, 1997 and Aug. 20-23, 1997; pp. 1-10; Lawrence Livermore National Laboratory; Livermore, California.

Teller, Edward; Ishikawa, Muriel; Wood, Lowell; Hyde, Roderick; and Nuckolls, John; "Completely Automated Nuclear Power Reactors for Long-Term Operation: III. Enabling Technology for Large-Scale, Low-Risk, Affordable Nuclear Electricity" University of California Lawrence Livermore National Laboratory, Livermore, California 94551; presented at the Jul. 2003 Workshop of the Aspen Global Change Institute; pp. 1-57.

Teller, Edward; Ishikawa, Muriel; Wood, Lowell; "Completely Automated Nuclear Reactors for Long-Term Operation"; Frontiers in Physics Symposium, Joint American Physical Society and the America Association of Physics Teachers Texas meeting Oct. 26-28, 1995; Jan. 1996; Lubbock, Texas; pp. 1-15.

Wood, Lowell; Hyde, Rod; Ishikawa, Muriel; "Novel Approaches to Nuclear Fission Power Generation: A Practical, Manifestly Safe Point-Design for World-Wide Civil Use in the $21^{st}$ Century", LLNL P&AT/CGSR ad hoc session: bearing a date of Apr. 25, 2001; pp. 1-15.

Wood, Lowell; Ishikawa, Muriel; Hyde, Roderick; "Global Warming and Nuclear Power"; $9^{th}$ Summer Workshop, Innovative Energy Systems and CO2 Stabilization Jul. 14-24, 1998, Aspen Global Change Institute; Jul. 10, 1998; Aspen, Colorado; pp. 1-21.

Wood, Lowell; Ishikawa, Muriel; Hyde, Roderick; "Global Warming and Nuclear Power"; Innovative Energy Systems and CO2 Stabilization; bearing dates of Jul. 10, 1998 and Jul. 14-24, 1998; Lawrence Livermore National Laboratory; Livermore, California.

European Search Report; App. No. 09742958.3; Mar. 29, 2011; p. 1-4.

Sekimoto, Hiroshi, Miyashita, Seiichi; "Startup of 'Candle' burnup in fast reactor from enriched uranium core"; Energy Conversion and Management; May 22, 2006; p. 2772-2780; vol. 47; Elsevier Ltd.

Ohoka, Yasunori; Watanabe, Takashi; and Sekimoto, Hiroshi; "Simulation Study on Candle Burnup Applied to Block-Type High Temperature Gas Cooled Reactor"; Progress in Nuclear Energy; 2005; pp. 292-299; vol. 47, No. 1-4; Elsevier, Ltd.; Great Britain.

European Search Report; App. No. 07872643; Jun. 6, 2011; pp. 1-13.

Chen et al.; "Transverse buckling effects on solitary burn-up waves"; Annals of Nuclear Energy; bearing dates of Dec. 24, 2004, Jan. 5, 2005, and Apr. 29, 2005; pp. 1377-1390; vol. 32; Elsevier Ltd.

St. Clair, Richard; Summary of MIT-Tokyo Tech Symposium on Innovative Nuclear Energy Systems; Nov. 2-4, 2005; pp. 1-17; MIT Department of Nuclear Science and Engineering; Cambridge, MA.

PCT International Search Report; International App. No. PCT/US09/03028; Jul. 7, 2009; pp. 1-2.

European Office Action; European App. No. EP 09 742 958.3; Nov. 15, 2011; pp. 1-3.

Code of Federal Regulations, 10 CFR Parts 0-50; Jan. 1, 1994; pp. 624 and 724-726; Office of the Federal Register, National Archives and Records Administration.

Hyde et al.; "Nuclear Fission Power for $21^{st}$ Century Needs: Enabling Technologies for Large-Scale, Low-Risk, Affordable Nuclear Electricity"; Progress in Nuclear Energy; 2007; pp. 82-91; vol. 50; Elsevier Ltd.

Chinese Patent Office; First Office Action; App. No. 2007/80049972.8 (based on PCT Patent Application No. PCT/US07/024375); Feb. 1, 2012; pp. 1-4.

Chinese Patent Office; First Office Action; App. No. 2007/80049941.2; Jan. 29, 2012; no translation available.

(Author unknown); "CEFR"; bearing a date of Oct. 1, 1998; pp. 1-1 through 1-8; no translation available.

European Patent Office Search Report; App. No. EP 07 872 643.7; Feb. 3, 2012; pp. 1-3.

European Patent Office; Communication Pursuant to Article 94(3) EPC; Application No. 09 746 986.0; Jan. 31, 2013; pp. 1-5.

Chinese Patent Office First Office Action (with attachment); App. No. 2007/80049881.4; Dec. 29, 2011; 15 pages (including attachment); no translation available.

European Patent Office, Summons to attend oral proceedings pursuant to Rule 115(1) EPC; App. No. 07872643.7; Feb. 21, 2013; pp. 1-4.

Japanese Patent Office; The First Office Action (Notice of Reason for Refusal); App. No. 2010-546768 (based on PCT Patent Application No. PCT/US2009/000763); Jun. 18, 2013; pp. 1-5 (machine translation provided, 8 pages).

European Patent Office Search Report; App. No. EP 09 74 6986; Feb. 22, 2012; pp. 1-7.

European Patent Office; Supplementary European Search Report; App. No. EP 07 87 3828; Jun. 26, 2012; pp. 1-3.

Wood, Lowell et al.; "Novel Approaches to Nuclear Fission Power Generation: A Practical, Manifestly Safe Point-Design for World-Wide Civil Use in the $21^{st}$ Century"; Discussion at LLNL P&AT/CGSR ad hoc session; Apr. 25, 2001; 15 pages.

Russian Federal Service for Intellectual Property; Office Action; Russian Application No. 2010147880; Oct. 17, 2012; 19 pages; (machine translation to English provided, 12 pages).

Chinese Patent Office; Second Office Action; Patent App. No. 200780049972.8; Dec. 31, 2012; pp. 1-6 (no translation provided).

Chinese Patent Office; Office Action; Patent App. No. 200780049941.2; Dec. 28, 2012; pp. 1-8 (no translation provided).

Chinese Patent Office; Second Office Action; Patent App. No. 200780049881.4; Dec. 28, 2012; pp. 1-4 (no translation provided).

Japanese Patent Office; Office Action; Patent App. No. 2009-539290; Jan. 8, 2013; pp. 1-6 (no translation provided).

Japanese Patent Office; Office Action; Patent App. No. 2009-539275; Jan. 8, 2013; pp. 1-7 (no translation provided).

Japanese Patent Office; Office Action; Patent App. No. 2009-539277; Jan. 8, 2013; pp. 1-4 (no translation provided).

(56) References Cited

OTHER PUBLICATIONS

Wang et al.; "Trial-manufacture of Cladding Materials of Core Sub-assemblies in China Experimental Fast Reactor"; Atomic Energy Science and Technology; Jul. 2003; pp. 73-76; vol. 37, Suppl. (no translation provided).

Xu et al.; "China Experimental Fast Reactor"; China Institute of Atomic Energy, Beijing; bearing a date of 1995; pp. 53-59; China Academic Journal Electronic Publishing House (no translation provided).

Emelyanov, I. Y. et al.; "Construction of Nuclear Reactors: Textbook for Schools"; bearing a date of 1982; 2 pages; Energoizdat; Moscow, Russia (machine translation to English provided, 1 page).

Samoilov, A. G. et al.; "Nuclear Reactor Fuel Element"; bearing a date of 1996; 10 pages; Energoatomizdat; Moscow, Russia; (machine translation to English provided, 10 pages).

European Patent Office; European Search Report; Application No. EP 09 80 6943; Dec. 21, 2012; pp. 1-3.

European Patent Office; European Search Report; Application No. EP 07 87 3851; Dec. 21, 2012; pp. 1-4.

Ohoka et al.; "Simulation Study on CANDLE Burnup Applied to Block-Type High Temperature Gas Cooled Reactor"; Progress in Nuclear Energy; bearing a date of 2005; pp. 292-299; vol. 47, No. 1-4; Elsevier Ltd; Great Britain.

Russian Office Action; App. No. 2010136176/07(051427); dated Jul. 9, 2012; pp. 1-8 (3 pages of machine translation).

Emelyanov, I. Y. et al; "Design of Nuclear Reactors"; bearing a date of 1982; pp. 194-196; Energoatomizdat; Moscow.

Chinese State Intellectual Property Office; Notification of the First Office Action; App. No. 200980112650.2; Jan. 30, 2013; pp. 1-5 (No English Translation Provided).

\* cited by examiner

AUTOMATED NUCLEAR POWER REACTOR FOR LONG-TERM OPERATION

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 11/605,943, entitled AUTOMATED NUCLEAR POWER REACTOR FOR LONG-TERM OPERATION, naming Roderick A. Hyde, Muriel Y. Ishikawa, Nathan P. Myhrvold, and Lowell L. Wood, Jr. as inventors, filed Nov. 28, 2006, which is currently co-pending, or is an application of which a currently co-pending application is entitled to the benefit of the filing date.

For purposes of the USPTO extra-statutory requirements, the present application is related to U.S. patent application Ser. No. 11/605,848, entitled METHOD AND SYSTEM FOR PROVIDING FUEL IN A NUCLEAR REACTOR, naming Roderick A. Hyde, Muriel Y. Ishikawa, Nathan P. Myhrvold, and Lowell L. Wood, Jr. as inventors, filed Nov. 28, 2006, which is currently co-pending, or is an application of which a currently co-pending application is entitled to the benefit of the filing date.

For purposes of the USPTO extra-statutory requirements, the present application is related to U.S. patent application Ser. No. 11/605,933, entitled CONTROLLABLE LONG TERM OPERATION OF A NUCLEAR REACTOR, naming Roderick A. Hyde, Muriel Y. Ishikawa, Nathan P. Myhrvold, and Lowell L. Wood, Jr. as inventors, filed Nov. 28, 2006, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part, " for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

The present application relates to nuclear reactors, and systems, applications, and apparatuses related thereto.

SUMMARY

The following embodiments and aspects thereof are described and illustrated in conjunction with systems and methods which are meant to be exemplary and illustrative, not limiting in scope.

Exemplary embodiments provide automated nuclear fission reactors and methods for their operation. Exemplary embodiments and aspects include, without limitation, re-use of nuclear fission fuel, alternate fuels and fuel geometries, modular fuel cores, fast fluid cooling, variable burn-up, programmable nuclear thermostats, fast flux irradiation, temperature-driven neutron absorption, low coolant temperature cores, refueling, and the like.

In addition to the exemplary embodiments and aspects described above, further embodiments and aspects will become apparent by reference to the drawings and by study of the following detailed description.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

By way of overview, embodiments provide automated nuclear fission reactors and methods for their operation. Details of an exemplary reactor, exemplary core nucleonics, and operations, all given by way of non-limiting example, will be set forth first. Then, details will be set forth regarding several exemplary embodiments and aspects, such as without limitation re-use of nuclear fission fuel, alternate fuels and fuel geometries, modular fuel cores, fast fluid cooling, variable burn-up, programmable nuclear thermostats, fast flux irradiation, temperature-driven neutron absorption, low coolant temperature cores, refueling, and the like.

Figure 1A:
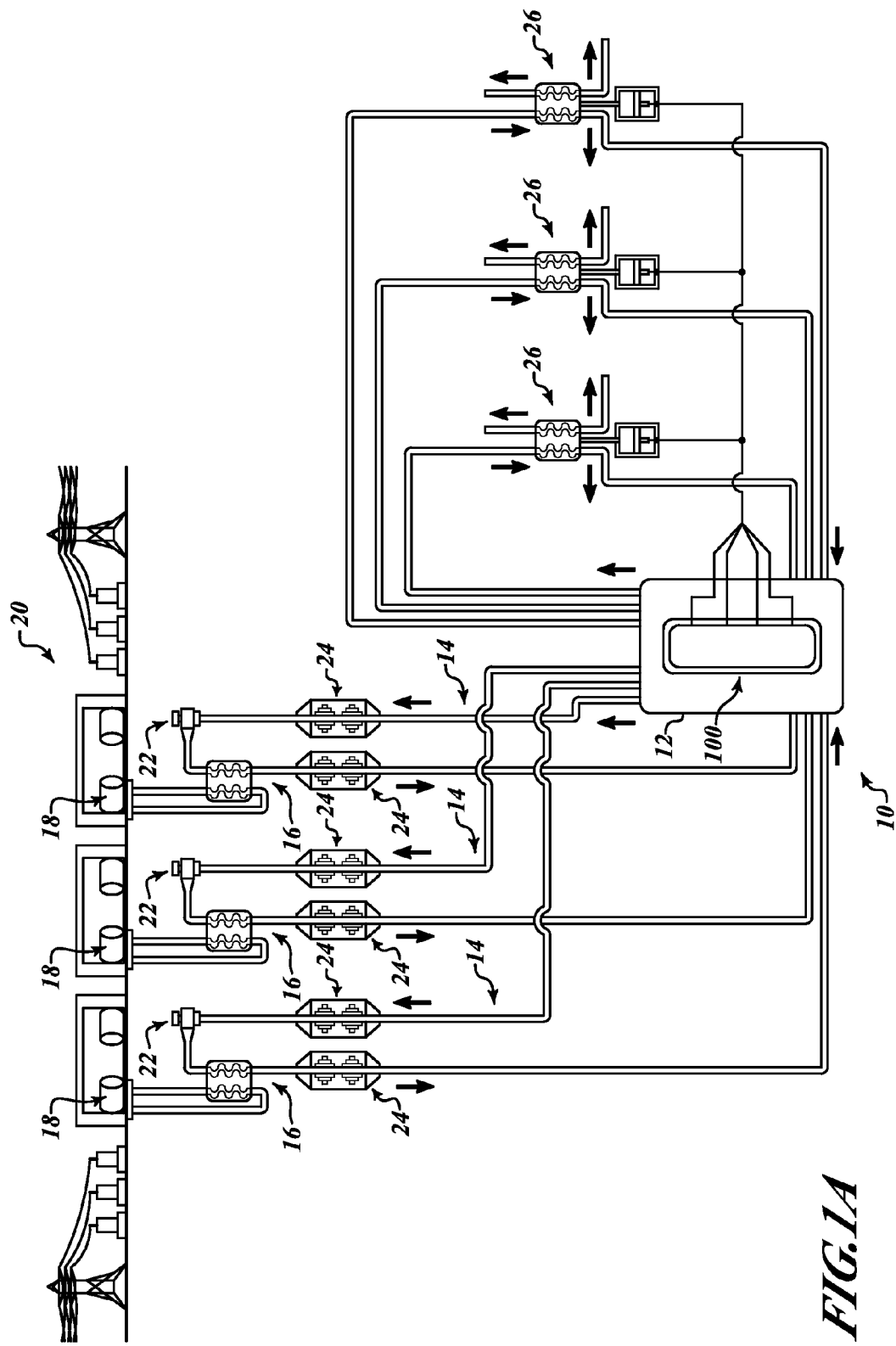
FIG. 1A schematically illustrates an exemplary nuclear fission reactor.

Referring now to FIG. 1A, a nuclear fission reactor 10, given by way of example and not of limitation, acts as an exemplary host environment for embodiments and aspects described herein. While many embodiments of the reactor 10 are contemplated, a common feature among many contemplated embodiments of the reactor 10 is origination and propagation of a nuclear fission deflagration wave, or "burn-front".

Considerations

Before discussing details of the reactor 10, some considerations behind embodiments of the reactor 10 will be given by way of overview but are not to be interpreted as limitations. Some embodiments of the reactor 10 reflect attainment of all of the considerations discussed below. On the other hand, some other embodiments of the reactor 10 reflect attainment of selected considerations, and need not accommodate all of the considerations discussed below. Portions of the following discussion includes information excerpted from a paper entitled "Completely Automated Nuclear Power Reactors For Long-Term Operation: III. Enabling Technology For Large-Scale, Low-Risk, Affordable Nuclear Electricity" by Edward Teller, Muriel Ishikawa, Lowell Wood, Roderick Hyde, and John Nuckolls, "PRESENTED AT the July 2003 Workshop of the Aspen Global Change Institute", University of California Lawrence Livermore National Laboratory publication UCRL-JRNL-122708 (2003). (This paper was prepared for submittal to *Energy, The International Journal*, 30 Nov. 2003.) the entire contents of which are hereby incorporated by reference.

Nuclear fission fuels envisioned for use in embodiments of the reactor 10 are typically widely available, such as without limitation uranium (natural, depleted, or enriched), thorium, plutonium, or even previously-burned nuclear fission fuel assemblies. Other, less widely available nuclear fission fuels, such as without limitation other actinide elements or isotopes thereof may be used in embodiments of the reactor 10. While embodiments of the reactor 10 contemplate long-term operation at full power on the order of around ⅓ century to around ½ century or longer, an aspect of some embodiments of the reactor 10 does not contemplate nuclear refueling (but instead contemplate burial in-place at ends-of-life) while some aspects of embodiments of the reactor 10 contemplate nuclear refueling—with some nuclear refueling occurring during shutdown and some nuclear refueling occurring during operation at power. It is also contemplated that nuclear fission fuel reprocessing may be avoided, thereby mitigating possibilities for diversion to military uses and other issues.

Other considerations behind embodiments of the reactor 10 include disposing in a manifestly safe manner long-lived radioactivity generated in the course of operation. It is envisioned that the reactor 10 may be able to mitigate damage due to operator error, casualties such as a loss of coolant accident (LOCA), or the like. In some aspects decommissioning may be effected in a low-risk and inexpensive manner.

As a result, some embodiments of the reactor 10 may entail underground siting, thereby addressing large, abrupt releases and small, steady-state releases of radioactivity into the biosphere. Some embodiments of the reactor 10 may entail minimizing operator controls, thereby automating those embodiments as much as practicable. In some embodiments, a life-cycle-oriented design is contemplated, wherein those embodiments of the reactor 10 can operate from startup to shutdown at end-of-life in as fully-automatic manner as practicable. Some embodiments of the reactor 10 lend themselves to modularized construction. Finally, some embodiments of the reactor 10 may be designed according to high power density.

Some features of various embodiments of the reactor 10 result from some of the above considerations. For example, simultaneously accommodating desires to achieve ⅓-½ century (or longer) of operations at full power without nuclear refueling and to avoid nuclear fission fuel reprocessing entails use of a fast neutron spectrum. As another example, in some embodiments a negative temperature coefficient of reactivity ($\alpha_T$) is engineered-in to the reactor 10, such as via negative feedback on local reactivity implemented with strong absorbers of fast neutrons. As a further example, in some embodiments of the reactor 10 a distributed thermostat enables a propagating nuclear fission deflagration wave mode of nuclear fission fuel burn. This mode simultaneously permits a high average burn-up of non-enriched actinide fuels, such as natural uranium or thorium, and use of a comparatively small "nuclear fission igniter" region of moderate isotopic enrichment of nuclear fissionable materials in the core's fuel charge. As another example, in some embodiments of the reactor 10, multiple redundancy is provided in primary and secondary core cooling.

Exemplary Embodiment of Nuclear Fission Reactor

Now that some of the considerations behind some of the embodiments of the reactor 10 have been set forth, further details regarding an exemplary embodiment of the reactor 10 will be explained. It is emphasized that the following description of an exemplary embodiment of the reactor 10 is given by way of non-limiting example only and not by way of limitation. As mentioned above, several embodiments of the reactor 10 are contemplated, as well as further aspects of the reactor 10. After details regarding an exemplary embodiment of the reactor 10 are discussed, other embodiments and aspects will also be discussed.

Still referring to FIG. 1A, an exemplary embodiment of the reactor 10 includes a nuclear fission reactor core assembly 100 that is disposed within a reactor pressure vessel 12. Several embodiments and aspects of the nuclear fission reactor core assembly 100 are contemplated that will be discussed later. Some of the features that will be discussed later in detail regarding the nuclear fission reactor core assembly 100 include nuclear fission fuel materials and their respective nucleonics, fuel assemblies, fuel geometries, and initiation and propagation of nuclear fission deflagration waves.

The reactor pressure vessel 12 suitably is any acceptable pressure vessel known in the al and may be made from any materials acceptable for use in reactor pressure vessels, such as without limitation stainless steel. Within the reactor pressure vessel 12, a neutron reflector (not shown) and a radiation shield (not shown) surround the nuclear fission reactor core assembly 100. In some embodiments, the reactor pressure vessel 12 is sited underground. In such cases, the reactor pressure vessel 12 can also function as a burial cask for the nuclear fission reactor core assembly 100. In these embodiments, the reactor pressure vessel 12 suitably is surrounded by a region (not shown) of isolation material, such as dry sand, for long-term environmental isolation. The region (not shown) of isolation material may have a size of around 100 m in diameter or so. However, in other embodiments, the reactor pressure vessel 12 is sited on or toward the Earth's surface.

Reactor coolant loops 14 transfer heat from nuclear fission in the nuclear fission reactor core assembly 100 to application heat exchangers 16. The reactor coolant may be selected as desired for a particular application. In some embodiments, the reactor coolant suitably is helium (He) gas. In other embodiments, the reactor coolant suitably may be other pressurized inert gases, such as neon, argon, krypton, xenon, or other fluids such as water or gaseous or superfluidic carbon dioxide, or liquid metals, such as sodium or lead, or metal alloys, such as Pb—Bi, or organic coolants, such as polyphenyls, or fluorocarbons. The reactor coolant loops suitably may be made from tantalum (Ta), tungsten (W), aluminum (Al), steel or other ferrous or non-iron groups alloys or titanium or zirconium-based alloys, or from other metals and alloys, or from other structural materials or composites, as desired.

In some embodiments, the application heat exchangers 16 may be steam generators that generate steam that is provided as a prime mover for rotating machinery, such as electrical turbine-generators 18 within an electrical generating station 20. In such a case, the nuclear fission reactor core assembly 100 suitably operates at a high operating pressure and temperature, such as above 1,000K or so and the steam generated in the steam generator may be superheated steam. In other embodiments, the application heat exchanger 16 may be any steam generator that generates steam at lower pressures and temperatures (that is, need not be not superheated steam) and the nuclear fission reactor core assembly 100 operates at temperatures less than around 550K. In these cases, the application heat exchangers 16 may provide process heat for applications such as desalination plants for seawater or for processing biomass by distillation into ethanol, or the like.

Optional reactor coolant pumps 22 circulate reactor coolant through the nuclear fission reactor core assembly 100 and the application heat exchangers 16. Note that although the illustrative embodiment shows pumps and gravitationally driven circulation, other approaches may not utilize pumps, or circulatory structures or be otherwise similarly geometrically limited. The reactor coolant pumps 22 suitably are provided when the nuclear fission reactor core assembly 100 is sited approximately vertically coplanar with the application heat exchangers 16, such that thermal driving head is not generated. The reactor coolant pumps 22 may also be provided when the nuclear fission reactor core assembly 100 is sited underground. However, when the nuclear fission reactor core assembly 100 is sited underground or in any fashion so the nuclear fission reactor core assembly 100 is vertically spaced below the application heat exchangers 16, thermal driving head may be developed between the reactor coolant exiting the reactor pressure vessel 12 and the reactor coolant exiting the application heat exchangers 16 at a lower temperature than the reactor coolant exiting the reactor pressure vessel 12. When sufficient thermal driving head exists, the reactor coolant pumps 22 need not be provided in order to provide sufficient circulation of reactor coolant through the nuclear fission reactor core assembly 100 to remove heat from fission during operation at power.

In some embodiments more than one reactor coolant loop 14 may be provided, thereby providing redundancy in the event of a casualty, such as a loss of coolant accident (LOCA) or a loss of flow accident (LOFA) or a primary-to-secondary leak or the like, to any one of the other reactor coolant loops 14. Each reactor coolant loop 14 is typically rated for full-power operation, though some applications may remove this constraint.

In some embodiments, one-time closures 24, such as reactor coolant shutoff valves, are provided in lines of the reactor coolant system 14. In each reactor coolant loop 14 provided, a closure 24 is provided in an outlet line from the reactor pressure vessel 12 and in a return line to the reactor pressure vessel 12 from an outlet of the application heat exchanger 16. The one-time closures 24 are fast-acting closures that shut quickly under emergency conditions, such as detection of significant fission-product entrainment in the reactor coolant. The one-time closures 24 are provided in addition to a redundant system of automatically-actuated conventional valves (not shown).

Heat-dump heat exchangers 26 are provided for removal of after-life heat (decay heat). The heat-dump heat exchanger 26 includes a primary loop that is configured to circulate decay heat removal coolant through the nuclear fission reactor core assembly 100. The heat-dump heat exchanger 26 includes a secondary loop that is coupled to an engineered heat-dump heat pipe network (not shown). In some situations, for example, for redundancy purposes, more than one of the heat-dump heat exchanger 26 may be provided. Each of the heat-dump heat exchangers 26 provided may be sited at a vertical distance above the nuclear fission reactor core assembly 100 so sufficient thermal driving head is provided to enable natural flow of decay heat removal coolant without need for decay heat removal coolant pumps. However, in some embodiments decay heat removal pumps (not shown) may be provided or, if not provided, the reactor coolant pumps may be used for decay heat removal, where appropriate.

Now that an overview of an exemplary embodiment of the reactor 10 has been given, other embodiments and aspects will be discussed. First, embodiments and aspects of the nuclear fission reactor core assembly 100 will be discussed. An overview of the nuclear fission reactor core assembly 100 and its nucleonics and propagation of a nuclear fission deflagration wave will be set forth first, followed by descriptions of exemplary embodiments and other aspects of the nuclear fission reactor core assembly 100.

Given by way of overview and in general terms, structural components of the reactor core assembly 100 may be made of tantalum (Ta), tungsten (W), rhenium (Re), or carbon composite, ceramics, or the like. These materials are suitable because of the high temperatures at which the nuclear fission reactor core assembly 100 operates, and because of their creep resistance over the envisioned lifetime of full power operation, mechanical workability, and corrosion resistance. Structural components can be made from single materials, or from combinations of materials (e.g., coatings, alloys, multi-layers, composites, and the like). In some embodiments, the reactor core assembly 100 operates at sufficiently lower temperatures so that other materials, such as aluminum (Al), steel, titanium (Ti) or the like can be used, alone or in combinations, for structural components.

The nuclear fission reactor core assembly 100 includes a small nuclear fission igniter and a larger nuclear fission deflagration burn-wave-propagating region. The nuclear fission deflagration burn-wave-propagating region suitably contains thorium or uranium fuel, and functions on the general principle of fast neutron spectrum fission breeding. In some embodiments, uniform temperature throughout the nuclear fission reactor core assembly 100 is maintained by thermostating modules, described in detail later, which regulate local neutron flux and thereby control local power production.

The nuclear fission reactor core assembly 100 suitably is a breeder for reasons of efficient nuclear fission fuel utilization and of minimization of requirements for isotopic enrichment. Further, and referring now to FIGS. 1B and 1C, the nuclear fission reactor core assembly 100 suitably utilizes a fast neutron spectrum because the high absorption cross-section of fission products for thermal neutrons does not permit utilization of more than about 1% of thorium or of the more abundant uranium isotope, $U^{238}$, in uranium-fueled embodiments, without removal of fission products.

Figure 1B:
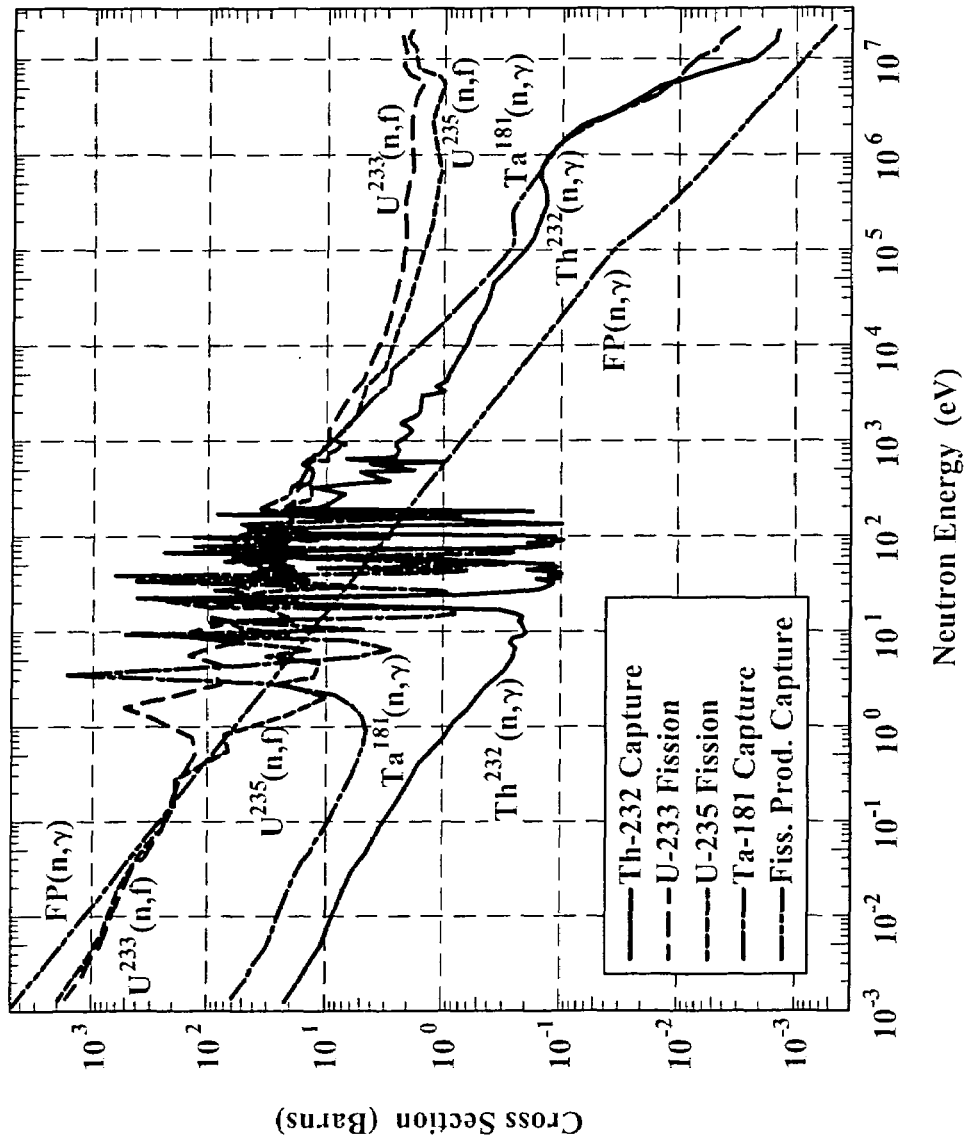
FIGS. 1B and 1C plot cross-section versus neutron energy.

In FIG. 1B, cross-sections for the dominant neutron-driven nuclear reactions of interest for the $Th^{232}$-fueled embodiments are plotted over the neutron energy range $10^{-3}$-$10^7$ eV. It can be seen that losses to radiative capture on fission product nuclei dominate neutron economies at near-thermal (~0.1 eV) energies, but are comparatively negligible above the resonance capture region (between ~3-300 eV). Thus, operating with a fast neutron spectrum when attempting to realize a high-gain fertile-to-fissile breeder can help to preclude fuel recycling (that is, periodic or continuous removal of fission products). The radiative capture cross-sections for fission products shown are those for intermediate-Z nuclei resulting from fast neutron-induced fission that have undergone subsequent beta-decay to negligible extents. Those in the central portions of the burn-waves of embodiments of the nuclear fission reactor core assembly 100 will have undergone some decay and thus will have somewhat higher neutron avidity. However, parameter studies have indicated that core fuel-burning results may be insensitive to the precise degree of such decay.

Figure 1C:
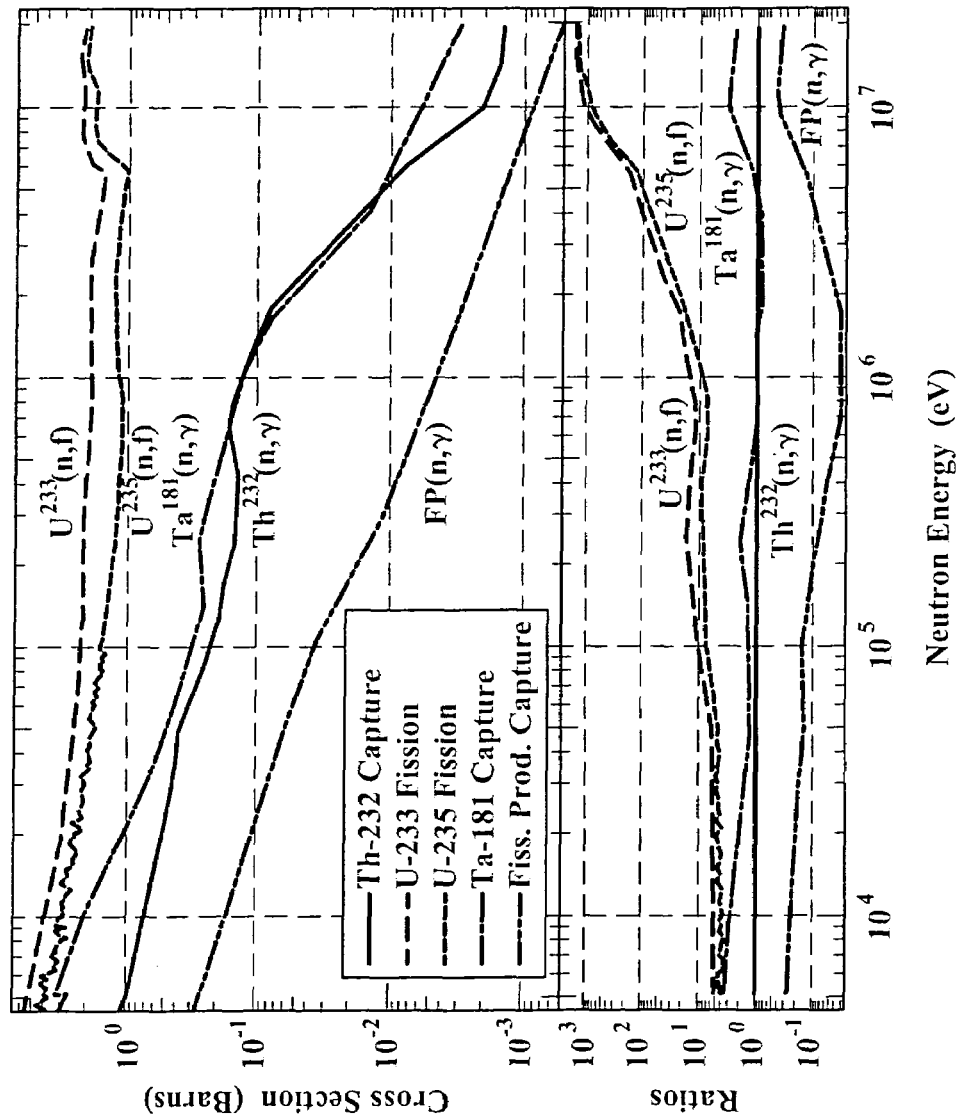

In FIG. 1C, cross-sections for the dominant neutron-driven nuclear reactions of primary interest for the $Th^{232}$-fueled embodiments are plotted over the most interesting portion of the neutron energy range, between >$10^4$ and <$10^{6.5}$ eV, in the upper portion of FIG. 1C. The neutron spectrum of embodiments of the reactor 10 peaks in the $\geq 10^5$ eV neutron energy region. The lower portion of FIG. 1C contains the ratio of these cross-sections vs. neutron energy to the cross-section for neutron radiative capture on $Th^{232}$, the fertile-to-fissile breeding step (as the resulting $Th^{233}$ swiftly beta-decays to $Pa^{233}$, which then relatively slowly beta-decays to $U^{233}$, analogously to the $U^{239}$—$Np^{239}$—$Pu^{239}$ beta decay-chain upon neutron capture by $U^{238}$).

It can be seen that losses to radiative capture on fission products are comparatively negligible over the neutron energy range of interest, and furthermore that atom-fractions of a few tens of percent of high-performance structural material, such as Ta, will impose tolerable loads on the neutron economy in the nuclear fission reactor core assembly 100. These data also suggest that core-averaged fuel burn-up in excess of 50% can be realizable, and that fission product-to-fissile atom-ratios behind the nuclear fission deflagration wave when reactivity is finally driven negative by fission-product accumulation will be approximately 10:1.

Origination and Propagation of Nuclear Fission Deflagration Wave Burnfront

The nuclear fission deflagration wave within the nuclear fission reactor core assembly 100 will now be explained. Propagation of deflagration burning-waves through combustible materials can release power at a predictable level. Moreover, if the material configuration has the requisite time-invariant features, the ensuing power production may be at a steady level. Finally, if deflagration wave propagation-speed may be externally modulated in a practical manner, the energy release-rate and thus power production may be controlled as desired.

For several reasons, steady-state nuclear fission detonation waves are not generally appropriate for power production, such as for electrical power generation and the like. Further, nuclear fission deflagration waves are rare in nature, due to having to prevent the initial nuclear fission fuel configuration from disassembling as a hydrodynamic consequence of energy release during the earliest phases of wave propagation.

However, in embodiments of the nuclear fission reactor core assembly 100 a nuclear fission deflagration wave can be initiated and propagated in a sub-sonic manner in fissionable fuel whose pressure is substantially independent of its temperature, so that its hydrodynamics is substantially 'clamped'. The nuclear fission deflagration wave's propagation speed within the nuclear fission reactor core assembly 100 can be controlled in a manner conducive to large-scale civilian power generation, such as in an electricity-producing reactor system like embodiments of the reactor 10.

Nucleonics of the nuclear fission deflagration wave are explained below. Inducing nuclear fission of selected isotopes of the actinide elements—the fissile ones—by capture of neutrons of any energy permits the release of nuclear binding energy at any material temperature, including arbitrarily low ones. Release of more than a single neutron per neutron captured, on the average, by nuclear fission of substantially any actinide isotope admits the possibility-in-principle of a diverging neutron-mediated nuclear-fission chain reaction in such materials. Release of more than two neutrons for every neutron which is captured (over certain neutron-energy ranges, on the average) by nuclear fission by some actinide isotopes admits the possibility-in-principle of first converting an atom of a non-fissile isotope to a fissile one (via neutron capture and subsequent beta-decay) by an initial neutron capture, and then of neutron-fissioning the nucleus of the newly-created fissile isotope in the course of a second neutron capture.

Most really high-Z (Z≥90) nuclear species can be combusted if, on the average, one neutron from a given nuclear fission event can be radiatively captured on a non-fissile-but-'fertile' nucleus which will then convert (such as via beta-decay) into a fissile nucleus and a second neutron from the same fission event can be captured on a fissile nucleus and, thereby, induce fission. In particular, if either of these arrangements is steady-state, then sufficient conditions for propagating a nuclear fission deflagration wave in the given material can be satisfied.

Due to beta-decay in the process of converting a fertile nucleus to a fissile nucleus, the characteristic speed of wave advance is of the order of the ratio of the distance traveled by a neutron from its fission-birth to its radiative capture on a fertile nucleus to the half-life of the (longest-lived nucleus in the chain of) beta-decay leading from the fertile nucleus to the fissile one. Since such a characteristic fission neutron-transport distance in normal-density actinides is approximately 10 cm and the beta-decay half-life is $10^5$-$10^6$ seconds for most cases of interest, the characteristic wave-speed is $10^{-4}$-$10^{-7}$ cm sec$^{-1}$, or $10^{-13}$-$10^{-14}$ of that of a nuclear detonation wave. Such a "glacial" speed-of-advance makes clear that the wave is that of a deflagration wave, not of a detonation wave.

The deflagration wave propagates not only very slowly but very stably. If such a wave attempts to accelerate, its leading-edge counters ever-more-pure fertile material (which is quite lossy in a neutronic sense), for the concentration of fissile nuclei well ahead of the center of the wave becomes exponentially low, and thus the wave's leading-edge (referred to herein as a "burnfront") stalls. Conversely, if the wave slows, however, the local concentration of fissile nuclei arising from continuing beta-decay increases, the local rates of fission and neutron production rise, and the wave's leading-edge, that is the burnfront, accelerates.

Finally, if the heat associated with nuclear fission is removed sufficiently rapidly from all portions of the configuration of initially fertile matter in which the wave is propagating, the propagation may take place at an arbitrarily low material temperature—although the temperatures of both the neutrons and the fissioning nuclei may be around 1 MeV.

Such conditions for initiating and propagating a nuclear fission deflagration wave can be realized with readily available materials. While fissile isotopes of actinide elements are rare terrestrially, both absolutely and relative to fertile isotopes of these elements, fissile isotopes can be concentrated, enriched and synthesized. The use of both naturally-occurring and man-made ones, such as $U^{235}$ and $Pu^{239}$, respectively, in initiating and propagating nuclear fission detonation waves is well-known.

Consideration of pertinent neutron cross-sections (shown in FIGS. 1B and 1C) suggests that a nuclear fission deflagration wave can burn a large fraction of a core of naturally-occurring actinides, such as $Th^{232}$ or $U^{238}$, if the neutron spectrum in the wave is a 'hard' or 'fast' one. That is, if the neutrons which carry the chain reaction in the wave have energies which are not very small compared to the approximately 1 MeV at which they are evaporated from nascent fission fragments, then relatively large losses to the space-time—local neutron economy can be avoided when the local mass-fraction of fission products becomes comparable to that of the fertile material (recalling that a single mole of fissile material fission—converts to two moles of fission-product nuclei). Even neutronic losses to typical neutron-reactor structural materials, such as Ta, which has desirable high-temperature properties, may become substantial at neutron energies ≤0.1 MeV.

Another consideration is the (comparatively small) variation with incident neutron energy of the neutron multiplicity of fission, v, and the fraction of all neutron capture events which result in fission (rather than merely γ-ray emission). The algebraic sign of the function $\alpha(v-2)$ constitutes a necessary condition for the feasibility of nuclear fission deflagration wave propagation in fertile material compared with the overall fissile isotopic mass budget, in the absence of neutron leakage from the core or parasitic absorptions (such as on fission products) within its body, for each of the fissile isotopes of the nuclear fission reactor core assembly 100. The algebraic sign is generally positive for all fissile isotopes of interest, from fission neutron-energies of approximately 1 MeV down into the resonance capture region.

The quantity $\alpha(v-2)/v$ upper-bounds the fraction of total fission-born neutrons which may be lost to leakage, parasitic absorption. or geometric divergence during deflagration wave propagation. It is noted that this fraction is 0.5-0.30 for the major fissile isotopes over the range of neutron energies which prevails in all effectively unmoderated actinide isotopic configurations of practical interest (approximately 0.1-1.5 MeV). In contrast to the situation prevailing for neutrons of (epi-) thermal energy (see FIG. 1C), in which the parasitic losses due to fission products dominate those of fertile-to-fissile conversion by 1-1.5 decimal orders-of-magnitude, fissile element generation by capture on fertile isotopes is favored over fission-product capture by 0.7-1.5 orders-of-magnitude over the neutron energy range 0.1-1.5 MeV. The former suggests that fertile-to-fissile conversion will be feasible only to the extent of 1.5-5% percent at-or-near thermal neutron energies, while the latter indicates that conversions in excess of 50% may be expected for near-fission energy neutron spectra.

In considering conditions for propagation of a nuclear fission deflagration wave, neutron leakage may be effectively ignored for very large, "self-reflected" actinide configurations. Referring to FIG. 1C and analytic estimates of the extent of neutron moderation-by-scattering entirely on actinide nuclei, it will be appreciated that deflagration wave propagation can be established in sufficiently large configurations of the two types of actinides that are relatively abundant terrestrially: $Th^{232}$ and $U^{238}$, the exclusive and the principal (that is, longest-lived) isotopic components of naturally-occurring thorium and uranium, respectively.

Specifically, transport of fission neutrons in these actinide isotopes will likely result in either capture on a fertile isotopic nucleus or fission of a fissile one before neutron energy has decreased significantly below 0.1 MeV (and thereupon becomes susceptible with non-negligible likelihood to capture on a fission-product nucleus). Referring to FIG. 1B, it will be appreciated that fission product nuclei concentrations must significantly exceed fertile ones and fissile nuclear concentrations may be an order-of-magnitude less than the lesser of fission-product or fertile ones before it becomes quantitatively questionable. Consideration of pertinent neutron scattering cross-sections suggests that right circular cylindrical configurations of actinides which are sufficiently extensive to be effectively infinitely thick—that is, self-reflecting—to fission neutrons in their radial dimension will have density-radius products >>200 gm/cm$^2$—that is, they will have radii >>10-20 cm of solid-density $U^{238}$—$Th^{232}$.

As an example, studies have indicated that circular cylinders of solid-density $Th^{232}$ of 25 cm radius, overcoated with an annular shell of 15 cm of $C^{12}$ (as graphite), may propagate nuclear fission deflagration waves with ≥70% burn-up of the $Th^{232}$ initially present. Moreover, studies have indicated that replacing the $Th^{232}$ with half-density $U^{238}$ may yield similar results—albeit fertile isotope burn-up of ≥80% is realized (as would be expected from inspection of FIG. 1C).

A basic condition on the 'local' geometry of the breeding-and-burning wave is that the flux history of neutrons excess to the local fissioning process in the core of the burn wave be quantitatively sufficient to at-least-reproduce the fissile atom density 1-2 mean-free-paths into the yet-unburned fuel, in a self-consistent sense. The 'ash' behind the burn-wave's peak is substantially 'neutronically neutral' in such an accounting scheme, since the neutronic reactivity of its fissile fraction is just balanced by the parasitic absorptions of structure and fission product inventories on top of leakage. If the fissile atom inventory in the wave's center and just in advance of it is time-stationary as the wave propagates, then it's doing so stably; if less, then the wave is 'dying', while if more, the wave may be said to be 'accelerating.'

Thus, a nuclear fission deflagration wave may be propagated and maintained in substantially steady-state conditions for long time intervals in configurations of naturally-occurring actinide isotopes.

The above discussion has considered, by way of non-limiting example, circular cylinders of natural uranium or thorium metal of less than a meter or so diameter—and that may be substantially smaller in diameter if efficient neutron reflectors are employed—that may stably propagate nuclear fission deflagration waves for arbitrarily great axial distances. However, propagation of nuclear fission deflagration waves is not to be construed to be limited to circular cylinders, to symmetric geometries, or to singly-connected geometries. To that end, additional embodiments of alternate geometries of the nuclear fission reactor core 100 will be described later.

Propagation of a nuclear fission deflagration wave has implications for embodiments of the nuclear fission reactor 10. As a first example, local material temperature feedback can be imposed on the local nuclear reaction rate at an acceptable expense in the deflagration wave's neutron economy. Such a large negative temperature coefficient of neutronic reactivity confers an ability to control the speed-of-advance of the deflagration wave. If very little thermal power is extracted from the burning fuel, its temperature rises and the temperature-dependent reactivity falls, and the nuclear fission rate at wave-center becomes correspondingly small and the wave's equation-of-time reflects only a very small axial rate-of-advance. Similarly, if the thermal power removal rate is large, the material temperature decreases and the neutronic reactivity rises, the intra-wave neutron economy becomes relatively undamped, and the wave advances axially relatively rapidly. Details regarding exemplary implementations of temperature feedback within embodiments of the nuclear fission reactor core assembly 100 will be discussed later.

As a second example of implications of propagation of a nuclear fission deflagration wave on embodiments of the nuclear fission reactor 10, less than all of the total fission neutron production in the nuclear fission reactor 10 may be utilized. For example, the local material-temperature thermostating modules may use around 5-10% of the total fission neutron production in the nuclear fission reactor 10. Another ≤10% of the total fission neutron production in the nuclear fission reactor 10 may be lost to parasitic absorption in the relatively large quantities of high-performance, high-temperature, structure materials (such as Ta, W, or Re) employed in structural components of the nuclear fission reactor 10. This loss occurs in order to realize ≥60% thermodynamic efficiency in conversion to electricity and to gain high system safety figures-of-merit. The Zs of these materials, such as Ta, W and Re, are approximately 80% of that of the actinides, and thus their radiative capture cross-sections for high-energy neutrons are not particularly small compared to those of the actinides, as is indicated for Ta in FIGS. 1B and 1C. A final 5-10% of the total fission neutron production in the nuclear fission reactor 10 may be lost to parasitic absorption in fission products. As noted above, the neutron economy characteristically is sufficiently rich that approximately 0.7 of total fission neutron production is sufficient to sustain deflagration wave-propagation in the absence of leakage and rapid geometric divergence. This is in sharp contrast with (epi) thermal-neutron power reactors employing low-enrichment fuel, for which neutron-economy discipline in design and operation must be strict.

Figure 1D:
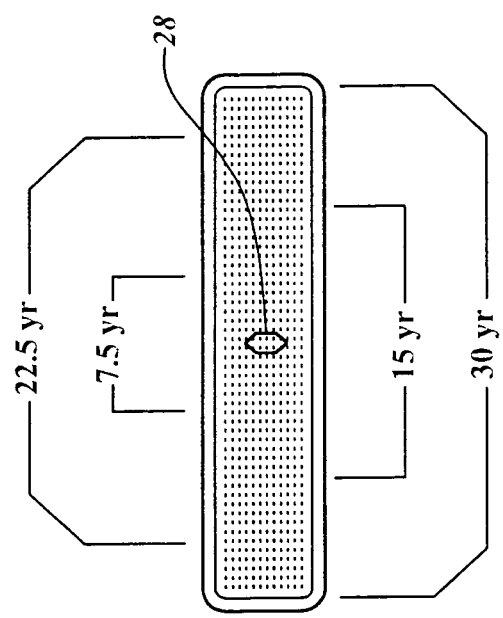
FIGS. 1D through 1H illustrate relative concentrations during times at operation of a nuclear fission reactor at power.
Figure 1E:
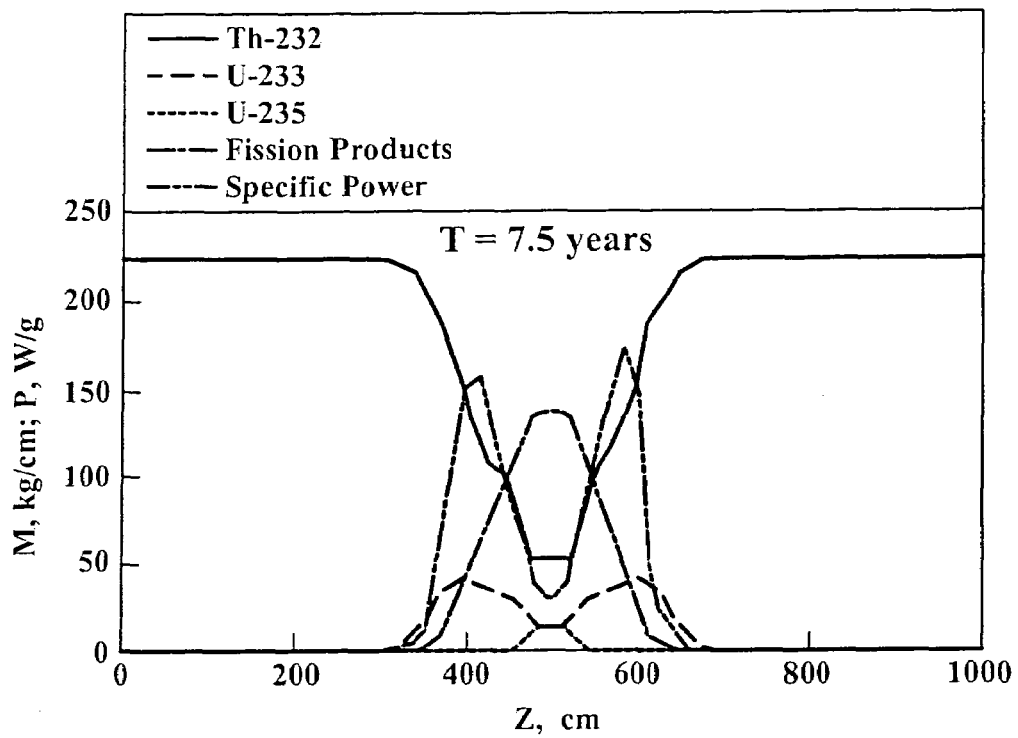
Figure 1F:
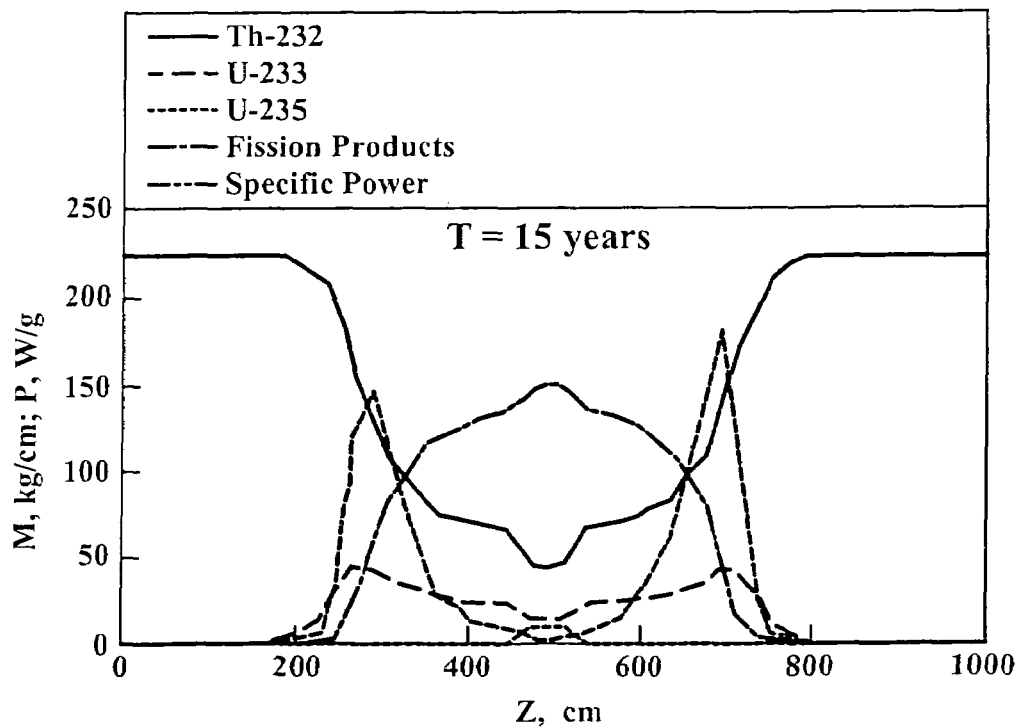
Figure 1G:
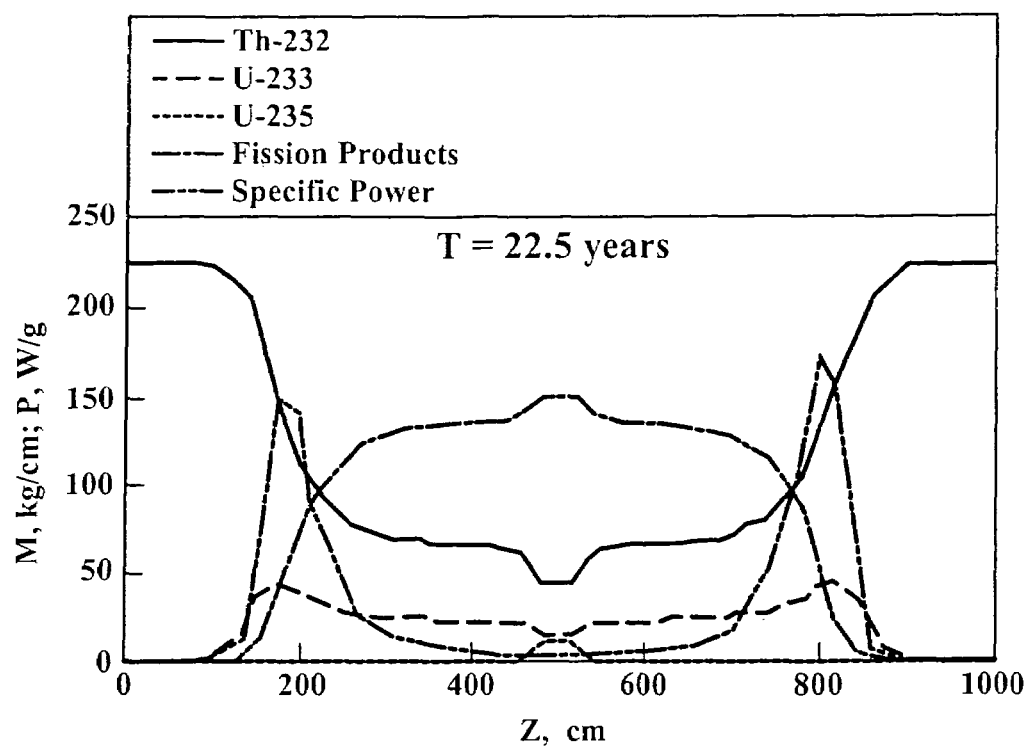
Figure 1H:
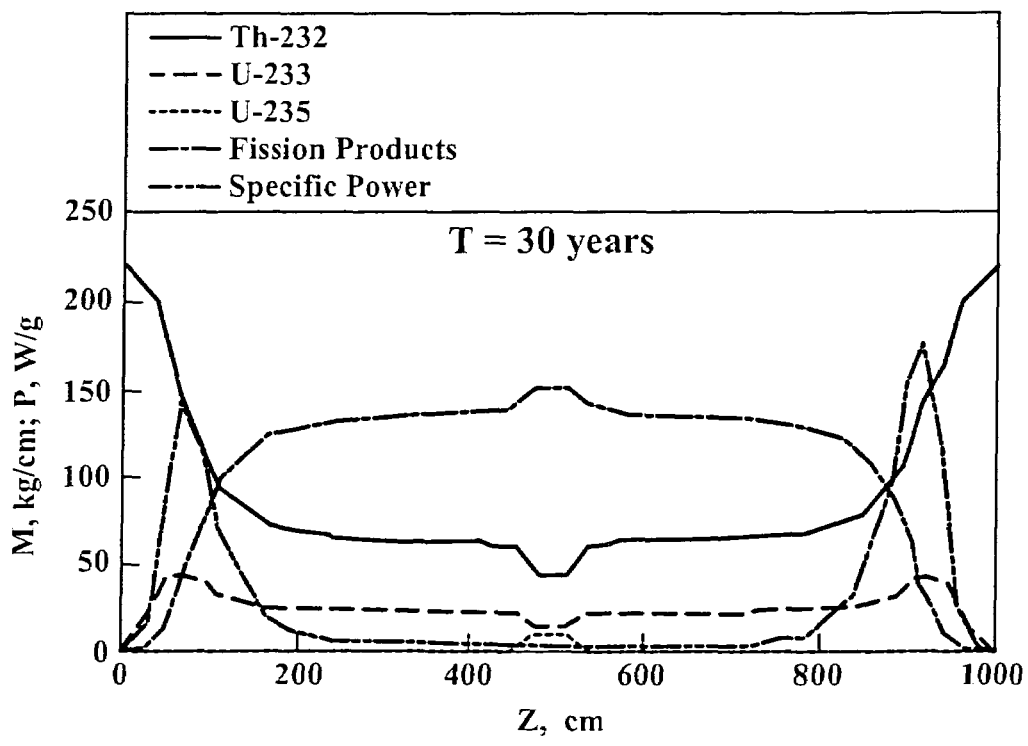

As a third example of implications of propagation of a nuclear fission deflagration wave on embodiments of the nuclear fission reactor 10, high burn-ups (on the order of around 50% to around 80%) of initial actinide fuel-inventories which are characteristic of the nuclear fission deflagration waves permit high-efficiency utilization of as-mined fuel—moreover without a requirement for reprocessing. Referring now to FIGS. 1D-1H, features of the fuel-charge of embodiments of the nuclear fission reactor core assembly 100 are depicted at four equi-spaced times during the operational life of the reactor after origination of the nuclear fission deflagration wave (sometimes referred to herein as "nuclear fission ignition") in a scenario in which full reactor power is continuously demanded over a ⅓ century time-interval. In the embodiment shown, two nuclear fission deflagration wavefronts propagate from an origination point 28 (near the center of the nuclear fission reactor core assembly 100) toward ends of the nuclear fission reactor core assembly 100. Corresponding positions of the leading edge of the nuclear fission deflagration wave-pair at various time-points after full ignition of the fuel-charge of the nuclear fission reactor core assembly 100 are indicated in FIG. 1D. FIGS. 1E, 1F, 1G, and 1G illustrate masses (in kg of total mass per cm of axial core-length) of various isotopic components in a set of representative near-axial zones and fuel specific power (in W/g) at the indicated axial position as ordinate-values versus axial position along an exemplary, non-limiting 10-meter-length of the fuel-charge as an abscissal value at approximate times after nuclear fission ignition of approximately 7.5 years, 15 years, 22.5 years, and 30 years, respectively. The central perturbation is due to the presence of the nuclear fission igniter module indicated by the origination point 28 (FIG. 1D).

It will be noted that the neutron flux from the most intensely burning region behind the burnfront breeds a fissile isotope-rich region at the burnfront's leading-edge, thereby serving to advance the nuclear fission deflagration wave. After the nuclear fission deflagration wave's burnfront has swept over a given mass of fuel, the fissile atom concentration continues to rise for as long as radiative capture of neutrons on available fertile nuclei is considerably more likely than on fission product nuclei, while ongoing fission generates an ever-greater mass of fission products. Nuclear power-production density peaks in this region of the fuel-charge, at any given moment. It will also be noted that in the illustrated embodiments, differing actions of two slightly different types of thermostating units on the left and the right sides of the igniter module account for the corresponding slightly differing power production levels.

Still referring to FIGS. 1D-1H, it can be seen that well behind the nuclear fission deflagration wave's advancing burnfront, the concentration ratio of fission product nuclei (whose mass closely averages half that of a fissile nucleus) to fissile ones climbs to a value comparable to the ratio of the fissile fission to the fission product radiative capture cross-sections (FIG. 1B), the "local neutronic reactivity" thereupon goes slightly negative, and both burning and breeding effectively cease—as will be appreciated from comparing FIGS. 1E, 1F, 1G, and 1H with each other, far behind the nuclear fission deflagration wave burnfront.

In some embodiments of the nuclear fission reactor 10, all the nuclear fission fuel ever used in the reactor is installed during manufacture of the nuclear fission reactor core assembly 100, and no spent fuel is ever removed from the nuclear fission reactor core assembly 100, which is never accessed after nuclear fission ignition. However, in some other embodiments of the nuclear fission reactor 10, additional nuclear fission fuel is added to the nuclear fission reactor core assembly 100 after nuclear fission ignition. However, in some other embodiments of the nuclear fission reactor 10, spent fuel is removed from the reactor core assembly (and, in some embodiments, removal of spent fuel from the nuclear fission reactor core assembly 100 may be performed while the nuclear fission reactor 10 is operating at power). Regardless of whether or not spent fuel is removed, pre-expansion of the as-loaded fuel permits higher-density actinides to be replaced with lower-density fission products without any overall volume changes in fuel elements, as the nuclear fission deflagration wave sweeps over any given axial element of actinide 'fuel,' converting it into fission-product 'ash.' Launching of nuclear fission deflagration waves into $Th^{232}$ or $U^{238}$ fuel-charges is readily accomplished with 'nuclear fission igniter modules' enriched in fissile isotopes. Higher enrichments result in more compact modules, and minimum mass modules may employ moderator concentration gradients. In addition, nuclear fission igniter module design may be determined in part by non-technical considerations, such as resistance to materials diversion for military purposes in various scenarios. Such modules may employ $U^{235}$ in $U^{238}$, in sufficiently low concentration as to be effectively non-detonatable in any quantity or configuration—such as ≤20%—in contrast, for example, to technically more optimal $Pu^{239}$ in $Th^{232}$. Quantities of $U^{235}$ already excess to military stockpiles suffice for $\geq 10^4$ such nuclear fission igniter modules, corresponding to a total inventory of nuclear fission power reactors sufficient to supply 10 billion people with kilowatt-per-capita electricity.

While the illustrative nuclear fission igniter of the previously described embodiments included nuclear fission material configured to initiate propagation of the burning wavefront, in other approaches, the nuclear fission igniter may include other types of reactivity sources in addition to or in place of those previously described. For example, nuclear fission igniters may include "burning embers", e.g., nuclear fission fuel enriched in fissile isotopes via exposure to neutrons within a propagating nuclear fission deflagration wave reactor. Such "burning embers" may function as nuclear fission igniters, despite the presence of various amounts of fission product "ash". For example, nuclear fission igniters may include neutron sources using electrically driven sources of high energy ions (such as protons, deuterons, alpha particles, or the like) or electrons that may in turn produce neutrons. In one illustrative approach, a particle accelerator, such as a linear accelerator may be positioned to provide high energy protons to an intermediate material that may in turn provide such neutrons (e.g., through spallation). In another illustrative approach, a particle accelerator, such as a linear accelerator may be positioned to provide high energy electrons to an intermediate material that may in turn provide such neutrons (e.g., by electro-fission and/or photofission of high-Z elements). Alternatively, other known neutron emissive processes and structures, such as electrically induced fusion approaches, may provide neutrons (e.g., 14 Mev neutrons from D-T fusion) that may thereby initiate the propagating fission wave.

Now that nucleonics of the fuel charge and the nuclear fission deflagration wave have been discussed, further details regarding "nuclear fission ignition" and maintenance of the nuclear fission deflagration wave will be discussed. A centrally-positioned nuclear fission igniter moderately enriched in fissionable material, such as $U^{235}$, has a neutron-absorbing material (such as a borohydride) removed from it (such as by operator-commanded electrical heating), and the nuclear fission igniter becomes neutronically critical. Local fuel temperature rises to a design set-point and is regulated thereafter by the local thermostating modules (discussed in detail later). Neutrons from the fast fission of $U^{235}$ are mostly captured at first on local $U^{238}$ or $Th^{232}$.

It will be appreciated that uranium enrichment of the nuclear fission igniter may be reduced to levels not much greater than that of light water reactor (LWR) fuel by introduction into the nuclear fission igniter and the fuel region immediately surrounding it of a radial density gradient of a refractory moderator, such as graphite. High moderator density enables low-enrichment fuel to burn satisfactorily, while decreasing moderator density permits efficient fissile breeding to occur. Thus, optimum nuclear fission igniter design may involve trade-offs between proliferation robustness and the minimum latency from initial criticality to the availability of full-rated-power from the fully-ignited fuel-charge of the core. Lower nuclear fission igniter enrichments entail more breeding generations and thus impose longer latencies.

The maximum (unregulated) reactivity of the nuclear fission reactor core assembly 100 slowly decreases in the first phase of the nuclear fission ignition process because, although the total fissile isotope inventory is increasing monotonically, this total inventory is becoming more spatially dispersed. As a result of choice of initial fuel geometry, fuel enrichment versus position, and fuel density, it may be arranged for the maximum reactivity to still be slightly positive at the time-point at which its minimum value is attained. Soon thereafter, the maximum reactivity begins to increase rapidly toward its greatest value, corresponding to the fissile isotope inventory in the region of breeding substantially exceeding that remaining in the nuclear fission igniter. A quasi-spherical annular shell then provides maximum specific power production. At this point, the fuel-charge of the nuclear fission reactor core assembly 100 is referred to as "ignited."

Now that the fuel-charge of the nuclear fission reactor core assembly 100 has been "ignited", propagation of the nuclear fission deflagration wave. also referred to herein as "nuclear fission burning", will now be discussed. The spherically-diverging shell of maximum specific nuclear power production continues to advance radially from the nuclear fission igniter toward the outer surface of the fuel charge. When it reaches this surface, it naturally breaks into two spherical zonal surfaces, with one surface propagating in each of the two opposite directions along the axis of the cylinder. At this time-point, the full thermal power production potential of the core has been developed. This epoch is characterized as that of the launching of the two axially-propagating nuclear fission deflagration wave burnfronts. In some embodiments the center of the core's fuel-charge is ignited, thus generating two oppositely-propagating waves. This arrangement doubles the mass and volume of the core in which power production occurs at any given time, and thus decreases by two-fold the core's peak specific power generation, thereby quantitatively minimizing thermal transport challenges. However, in other embodiments, the core's fuel charge is ignited at one end, as desired for a particular application. In other embodiments, the core's fuel charge may be ignited in multiple sites. In yet other embodiments, the core's fuel charge is ignited at any 3-D location within the core as desired for a particular application. In some embodiments, two propagating nuclear fission deflagration waves will be initiated and propagate away from a nuclear fission ignition site, however, depending upon geometry, nuclear fission fuel composition, the action of neutron modifying control structures or other considerations, different numbers (e.g., one, three, or more) of nuclear fission deflagration waves may be initiated and propagated. However, for sake of understanding, the discussion herein refers, without limitation, to propagation of two nuclear fission deflagration wave burnfronts.

From this time forward through the break-out of the two waves when they reach the two opposite ends, the physics of nuclear power generation is effectively time-stationary in the frame of either wave, as illustrated in FIGS. 1E-1H. The speed of wave advance through the fuel is proportional to the local neutron flux, which in turn is linearly dependent on the thermal power demanded from the nuclear fission reactor core assembly 100 via the collective action on the nuclear fission deflagration wave's neutron budget of the thermostating modules (not shown).

When more power is demanded from the reactor via lower-temperature coolant flowing into the core, the temperature of the two ends of the core (which in some embodiments are closest to the coolant inlets) decreases slightly below the thermostating modules' design set-point, a neutron absorber is thereby withdrawn from the corresponding sub-population of the core's thermostating modules, and the local neutron flux is permitted thereby to increase to bring the local thermal power production to the level which drives the local material temperature up to the set-point of the local thermostating modules.

However, in the two burnfront embodiment this process is not effective in heating the coolant significantly until its two divided flows move into the two nuclear burn-fronts. These two portions of the core's fuel-charge—which are capable of producing significant levels of nuclear power when not suppressed by the neutron absorbers of the thermostating modules—then act to heat the coolant to the temperature specified by the design set-point of their modules, provided that the nuclear fission fuel temperature does not become excessive (and regardless of the temperature at which the coolant arrived in the core). The two coolant flows then move through the two sections of already-burned fuel centerward of the two burnfronts, removing residual nuclear fission and afterheat thermal power from them, both exiting the fuel-charge at its center. This arrangement encourages the propagation of the two burnfronts toward the two ends of the fuel-charge by "trimming" excess neutrons primarily from the trailing edge of each front, as illustrated in FIGS. 1E-1H.

Thus, the core's neutronics may be considered to be substantially self-regulated. For example, for cylindrical core embodiments, the core's nucleonics may be considered to be substantially self-regulating when the fuel density-radius product of the cylindrical core is $\geq 200$ gm/cm$^2$ (that is, 1-2 mean free paths for neutron-induced fission in a core of typical composition, for a reasonably fast neutron spectrum). The primary function of the neutron reflector in such core designs is to drastically reduce the fast neutron fluence seen by the outer portions of the reactor, such as its radiation shield, structural supports, thermostating modules and outermost shell. Its incidental influence on the performance of the core is to improve the breeding efficiency and the specific power in the outermost portions of the fuel, though the value of this is primarily an enhancement of the reactor's economic efficiency. Outlying portions of the fuel-charge are not used at low overall energetic efficiency, but have isotopic burn-up levels comparable to those at the center of the fuel-charge.

Final, irreversible negation of the core's neutronic reactivity may be performed at any time by injection of neutronic poison into the coolant stream, via either the primary loops which extend to the application heat exchangers 16 (FIG. 1A) or the afterheat-dumping loops connecting the nuclear fission reactor 10 (FIG. 1A) to the heat dump heat exchangers 26 (FIG. 1A). For example, lightly loading the coolant stream with a material such as BF$_3$, possibly accompanied by a volatile reducing agent such as H$_2$ if desired, may deposit metallic boron substantially uniformly over the inner walls of the coolant-tubes threading through the reactor's core, via exponential acceleration of the otherwise slow chemical reaction 2BF$_3$+3H$_2$->2B+6HF by the high temperatures found therein. Boron, in turn, is a highly refractory metalloid, and will not migrate from its site of deposition. Substantially uniform presence of boron in the core in <100 kg quantities may negate the core's neutronic reactivity for indefinitely prolonged intervals without involving the use of powered mechanisms in the vicinity of the reactor.

Exemplary Embodiments and Aspects of Reactor Core Assemblies

Exemplary embodiments and aspects of the nuclear fission reactor core assembly 100 and exemplary nuclear fission fuel charges disposed therein will now be discussed.

Figure 1I:
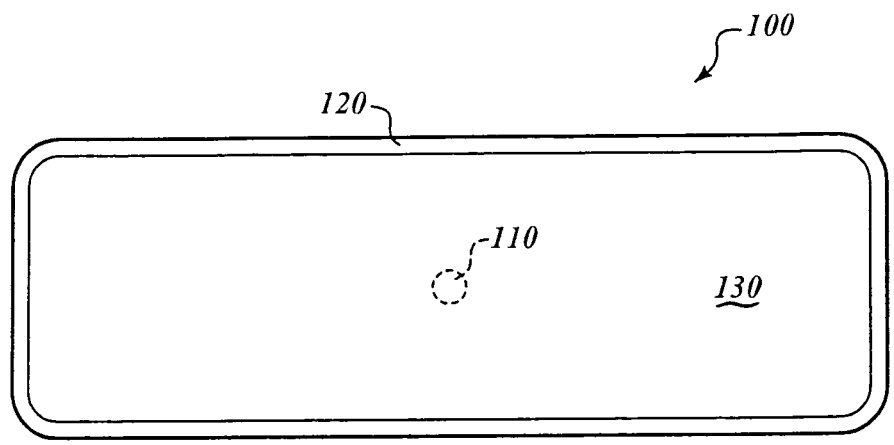
FIGS. 1I and 1J schematically illustrate an exemplary nuclear fission reactor core assembly.

Referring now to FIG. 1I, the nuclear fission reactor core assembly 100 is suitable for use with a fast neutron spectrum nuclear fission reactor. It will be appreciated that the nuclear fission reactor core assembly 100 is shown schematically in FIG. 1I. As such, no geometric limitations are intended regarding shape of the nuclear fission reactor core assembly 100. As mentioned above, details were discussed for circular cylinders of natural uranium or thorium metal that may stably propagate nuclear fission deflagration waves for arbitrarily great axial distances. However, it is again emphasized that propagation of nuclear fission deflagration waves is not to be construed to be limited to circular cylinders or to metallic nuclear fission fuels, or to pure uranium or thorium nuclear fission fuel materials. To that end, additional embodiments of alternate geometries of the nuclear fission reactor core assembly 100 and fuel charges disposed therein will be described later.

A neutron reflector/radiation shield 120 surrounds nuclear fission fuel 130. The nuclear fission fuel 130 is fissionable material, that is material appropriate for undergoing fission in a nuclear fission reactor, examples of which are actinide or transuranic elements. As discussed above, the fissionable material for the nuclear fission fuel 130 may include without limitation Th$^{232}$ or U$^{238}$. However, in other embodiments discussed below, other fissionable material may be used in the nuclear fission fuel 130. In some embodiments, the nuclear fission fuel 130 is contiguous. In other embodiments, the nuclear fission fuel 130 is non-contiguous.

A nuclear fission igniter 110 acts within the nuclear fission fuel 130 for initiating a nuclear fission deflagration wave burnfront (not shown). The nuclear fission igniter 110 is made and operates according to principles and details discussed above. Therefore, details of construction and operation of the nuclear fission igniter 110 need not be repeated for sake of brevity.

Figure 1J:
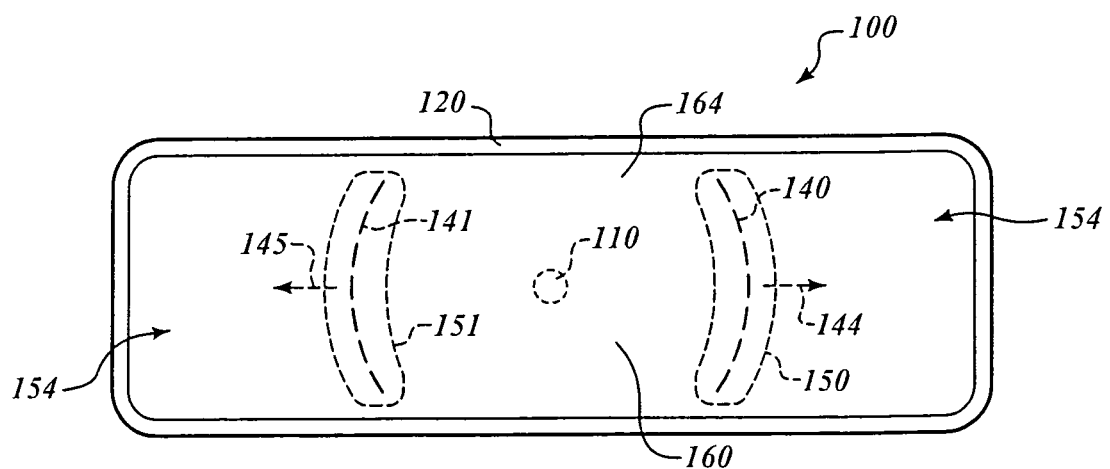

Referring now to FIG. 1J, after the nuclear fission fuel 130 (FIG. 1I) has been ignited by the nuclear fission igniter 110 (in a manner as discussed above), a propagating burnfront 140 (that is, a propagating nuclear fission deflagration wave burnfront, as discussed above) is initiated and propagates throughout the nuclear fission fuel 130 (FIG. 1I) in a direction shown by an arrow 144. As discussed above, a region 150 of maximum reactivity is established around the propagating burnfront 140. The propagating burnfront 140 propagates through unburnt nuclear fission fuel 154 in the direction indicated by the arrow 144, leaving behind the propagating burnfront 140 burnt nuclear fission fuel 160 that includes fission products 164, such as isotopes of iodine, cesium, strontium, xenon, and/or barium (and referred to in the discussion above as "fission product ash"). In the context of burnt nuclear fission fuel and unburnt nuclear fission fuel, the term "burning" (as applied to nuclear fission fuel) means that at least some components of the nuclear fission fuel undergo neutron-mediated nuclear fission. In the context of propagating nuclear fission deflagration wave burnfronts, the terms "burning" and "burnt" also mean that at least some components of the nuclear fission fuel undergo "breeding", whereby neutron absorption is followed by multi-second half-life beta-decay transmutation into one or more fissile isotopes, which then may or may not undergo neutron-mediated nuclear fission.

Thus, the unburnt nuclear fission fuel 154 may be considered a first neutron environment having a first set of neutron environment parameters. Similarly, the burnt nuclear fission fuel 160 may be considered a second neutron environment having a second set of neutron environment parameters that are different than the first set of neutron environment parameters. The term "neutron environment" refers to the detailed neutron distribution, including its variation with respect to time, space, direction, and energy. The neutron environment includes the aggregate of multiple individual neutrons, each of which may occupy different locations at different times, and each of which may have different directions of motion and different energies. In some circumstances, a nuclear environment may be characterized by a reduced subset of these detailed properties. In one example, a reduced subset may include an aggregation of all neutrons within given space, time, direction, and energy ranges of specified time, space, direction, and energy values. In another example, some or all of the time, space, direction, or energy aggregations may incorporate value-dependent weighting functions. In another example, a reduced subset may include weighted aggregation over the full range of direction and energy values. In another example, the aggregation over energies may involve energy-dependent weighting by a specified energy function. Examples of such weighting functions include material and energy-dependent cross-sections, such as those for neutron absorption or fission.

In some embodiments, only the propagating burnfront 140 is originated and propagated through the unburnt nuclear fission fuel 154. In such embodiments, the nuclear fission igniter 110 may be located as desired. For example, the nuclear fission igniter 110 may be located toward the center of the nuclear fission fuel 130 (FIG. 1I). In other embodiments (not shown) the nuclear fission igniter 110 may be located toward an end of the nuclear fission fuel 130.

In other embodiments, in addition to the propagating burnfront 140, a propagating burnfront 141 is originated and propagated through the other fuel 154 along a direction indicated by an arrow 145. A region 151 of maximum reactivity is established around the obligating burnfront 141. The propagating burnfront 141 leaves behind it the burnt nuclear fission fuel 160 and the Fission products 164. Principles and details of origination and propagation of the propagating burnfront 141 are the same as that previously discussed for the propagating burnfront 140. Therefore, details of origination and propagation of the propagating burnfront 141 need not be provided for sake of brevity.

Figure 2A:
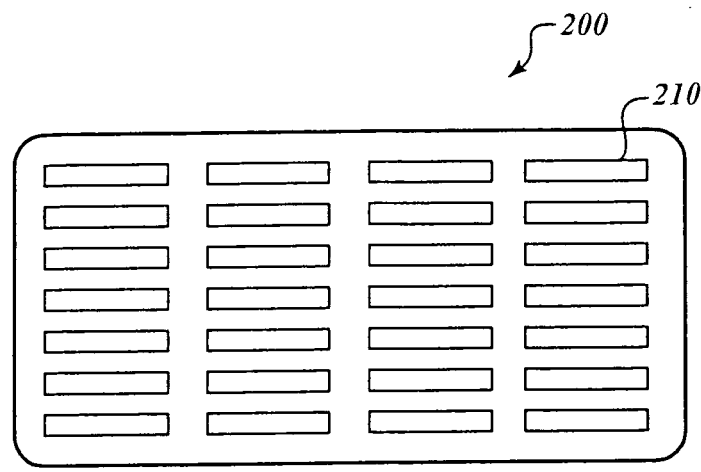
FIGS. 2A through 2C schematically illustrate exemplary nuclear fission fuel assemblies.

Referring now to FIG. 2A, a nuclear fission reactor 200, such as a fast neutron spectrum nuclear fission reactor, includes nuclear fission fuel assemblies 210 disposed therein. The following discussion includes details of exemplary nuclear fission fuel assemblies 210 that may be used in the nuclear fission reactor 200. Other details regarding the nuclear fission reactor 200, including origination and propagation of a nuclear fission deflagration wave burnfront (that is, "burning" the nuclear fission fuel) are similar to those of the nuclear fission reactor 10 (FIG. 1A), and need not be repeated for sake of brevity.

Figure 2B:
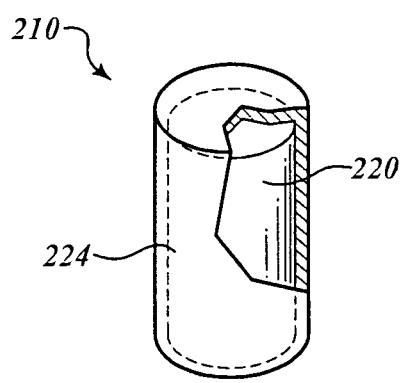

Referring now to FIG. 2B and given by way of non-limiting example, in one embodiment the nuclear fission fuel assembly 210 suitably includes a previously burnt nuclear fission fuel assembly 220. The previously burnt nuclear fission fuel assembly 220 is clad with cladding 224. The cladding 224 is the "original" cladding in which the previously burned nuclear fission fuel assembly 220 was clad. The term "previously burnt" means that at least some components of the nuclear fission fuel assembly 220 have undergone neutron-mediated nuclear fission and that the isotopic composition of the nuclear fission fuel has been modified. That is, the nuclear fission fuel assembly has been put in a neutron spectrum or flux (either fast or slow), at least some components have undergone neutron-mediated nuclear fission and, as result, the isotopic composition of the nuclear fission fuel has been changed. Thus, a burnt nuclear fission fuel assembly 220 may have been previously burnt in any reactor, such as without limitation a light water reactor. It is intended that the previously burnt nuclear fission fuel assembly 220 can include without limitation any type of nuclear fissionable material whatsoever appropriate for undergoing fission in a nuclear fission reactor, such as actinide or transuranic elements like natural thorium, natural uranium, enriched uranium, or the like. In some other embodiments, the previously burnt nuclear fission fuel assembly 220 may not be clad with "original" cladding 224, but in these embodiments, the previously burnt nuclear fission fuel assembly 220 is chemically untreated subsequent to its previous burning in the nuclear fission reactor 200.

Figure 2C:
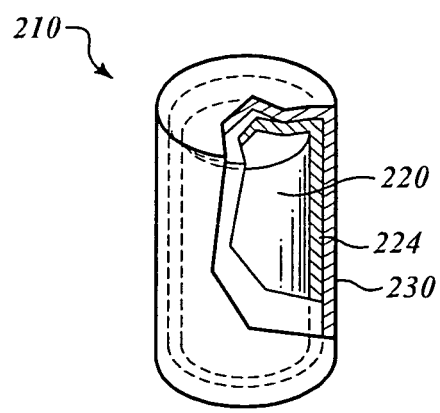
Figure 3A:
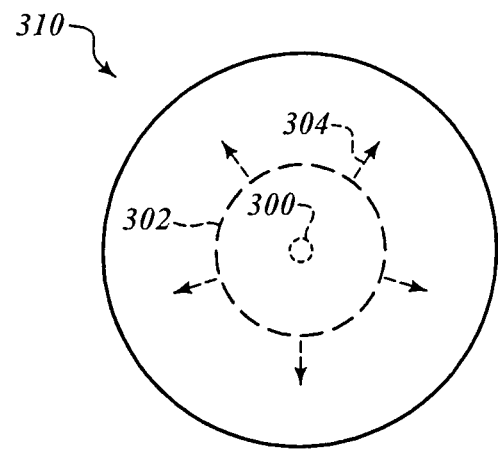
FIGS. 3A through 3D schematically illustrate exemplary nuclear fission fuel geometries.
Figure 3B:
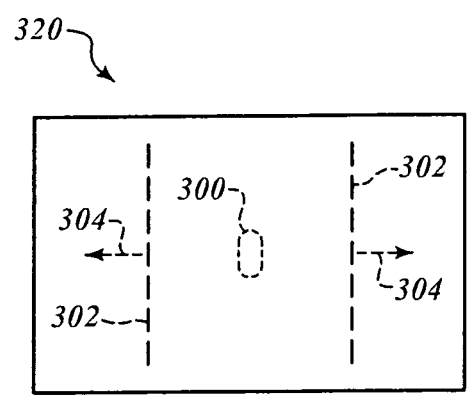
Figure 3C:
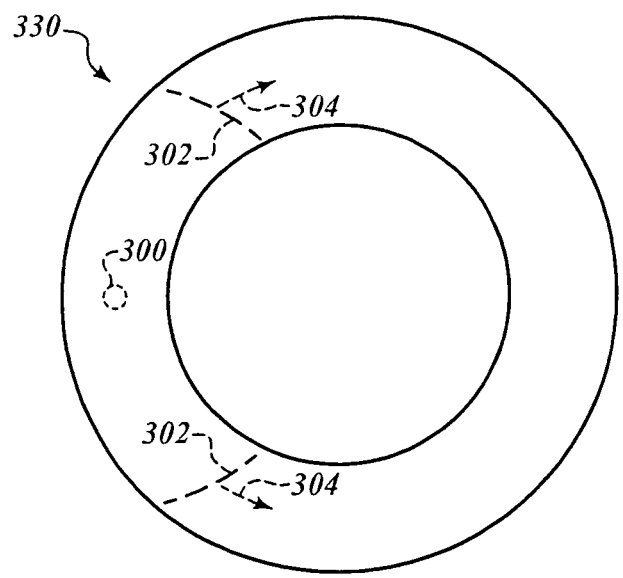
Figure 3D:
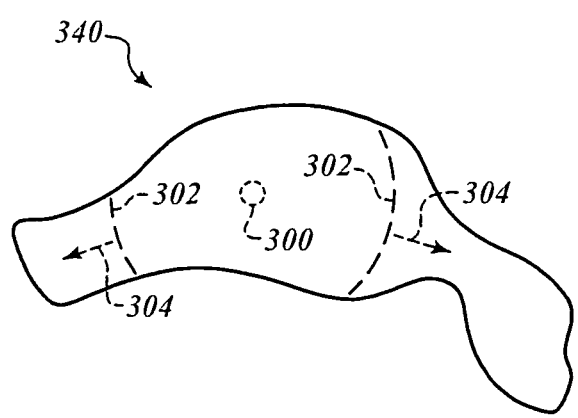

Referring now to FIG. 2C, the previously burnt nuclear fission fuel assembly 220 and its "original" cladding 224 is clad with cladding 230. Thus, the previously burnt nuclear fission fuel assembly 220 is retained in its original cladding 224, and the cladding 230 is disposed around an exterior of the cladding 224. The cladding 230 can accommodate swelling. For example, when the previously burnt nuclear fission fuel assembly 220 was burnt in a light water reactor, the cladding 224 was sufficient to contain swelling at approximately 3% burn-up of the previously burnt nuclear fission fuel assembly 220. In one nonlimiting example, the cladding 230 contacts the cladding 224 at azimuthally, symmetric, cylindrical faces around the cladding 224. Such an arrangement enables removal of heat through the contacting faces while allowing at least one half of the cladding 224 to expand into void spaces between the cladding 224 and the cladding 230.

In some embodiments, the cladding 230 is made up of cladding sections (not shown) that are configured to help accommodate swelling into the void spaces, as described above. In other embodiments, the cladding 230 may be provided as a barrier, such as a tube, provided between an exterior of the cladding 224 and reactor coolant (not shown).

In some other embodiments, the previously burned nuclear fission fuel assembly 220 is burnt in the nuclear fission reactor 200 as the nuclear fission fuel assembly 210. That is, the previously burnt nuclear fission fuel assembly 220 may not be clad with the cladding 230. This embodiment envisions burning the previously burnt nuclear fission fuel assembly 220, such as one that was burnt in a light water reactor, or in a fast neutron spectrum nuclear fission reactor, or in any other form of nuclear fission reactor and either (a) tolerating or planning to accept possible failure of the cladding 224 due to swell or, (b) burning the previously burnt nuclear fission fuel assembly 220 in the fast neutron spectrum nuclear fission reactor 200 to levels significantly less than isotopic depletion (in which case swelling may be of acceptable magnitude).

Referring now to FIGS. 3A, 3B, 3C, and 3D, alternate nuclear fission fuel geometries of nuclear fission fuel structures 310, 320, 330, and 340, respectively, are discussed. Each of the nuclear fission fuel structures 310, 320, 330, and 340 includes a nuclear fission igniter 300, and a propagating nuclear fission deflagration wave 302 is propagated in a direction indicated by an arrow 304.

In a spherical nuclear fission fuel structure 310 (FIG. 3A), the nuclear fission igniter 300 is disposed toward a center of the spherical nuclear fission fuel structure 310. The propagating burnfront 302 propagates radially outward from the nuclear fission igniter 300, as indicated by the arrows 304.

In a parallelepiped nuclear fission fuel structure 320, the nuclear fission igniter 300 is disposed as desired. As discussed above, two propagating burnfronts 302 may be originated and propagated toward ends of the parallelepiped nuclear fission fuel structure 320 along directions indicated by the arrows 304. Alternately, the nuclear fission igniter 300 may be disposed toward an end of the parallelepiped nuclear fission fuel structure 320, in which case one propagating burnfront 302 is originated and propagates toward the other end of the parallelepiped nuclear fission fuel structure 320 along the direction indicated by the arrow 304.

In a toroidal nuclear fission fuel structure 330 (FIG. 3C), the nuclear fission igniter 300 is disposed as desired. Two propagating burnfronts 302 may be originated and propagated away from the nuclear fission igniter 300 and toward each other along directions indicated by the arrows 304. In such a case, the toroidal nuclear fission fuel structure 330 may be considered to be "burnt" when the propagating burnfronts 302 meet, and propagation of the propagating burnfront 302 may stop. Alternately, only one propagating burnfront 302 is originated and propagates around the toroidal nuclear fission fuel structure 330 along the direction indicated by the arrow 304. In such a case, the toroidal nuclear fission fuel structure 330 may be considered to be "burnt" when the propagating burnfront 302 returns to the site of the nuclear fission igniter 300, and propagation of the propagating burnfront 302 may stop or may be re-started.

In another embodiment, the propagating burnfront 302 is "restarted" due to the removal or decay of fission products during the burnfront's propagation around the toroid. In another embodiment, the propagating burnfront 302 is "restarted" due to control of neutron modifying structures, as discussed later. In another embodiment, the toroidal nuclear fission fuel structure 330 is not a "geometric" toroid, but a "logical" toroid, with a more general reentrant structure.

As mentioned above, nuclear fission deflagration propagating wave burnfronts can be initiated and propagated in nuclear fission fuels having any shape as desired. For example, in an irregularly-shaped nuclear fission fuel structure 340, the nuclear fission igniter 300 can be located as desired. Propagating burnfronts 302 are initiated and propagate along directions indicated by the arrows 304 as desired for a particular application.

In one approach, thermal management may be adjusted to provide thermal control appropriate for any changes in operational parameters, such as revised neutronic action of the previously burnt or modified nuclear fission fuel or other parameter changes, that may result from removal of ash, addition of fuels, or from other parameters of re-burning.

In these exemplar geometries, the nuclear fission ignitor 300 may be any of the varieties of nuclear fission ignitor previously discussed. The indicated nuclear fission ignitor 300 is the site at which nuclear fission ignition occurs, but for some embodiments (e.g., electrical neutron sources) additional components of the nuclear fission ignitor may exist, and may reside in different physical locations.

Figure 4:
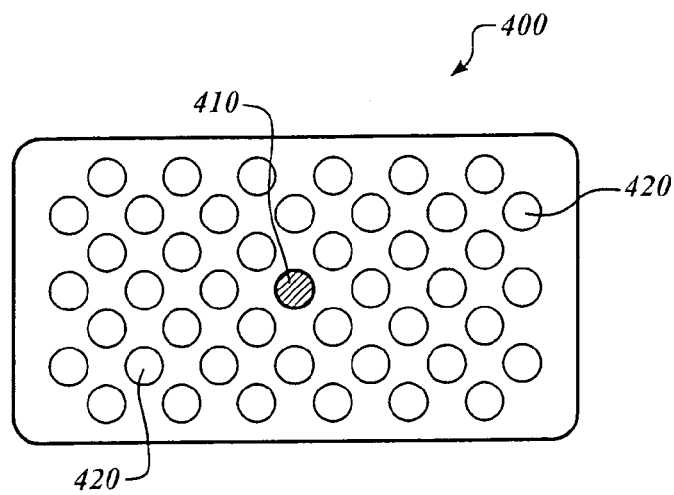
FIG. 4 schematically illustrates exemplary non-contiguous nuclear fission fuel material.

Referring now to FIG. 4, a nuclear fission fuel structure 400 includes a nuclear fission igniter 410 and non-contiguous segments 420 of nuclear fission fuel material. The behavior of a nuclear fission deflagration wave with non-contiguous segments 420 of nuclear fission fuel material is similar to that previously discussed for contiguous nuclear fission fuel material; it is crucial only that the non-contiguous segments 420 be in "neutronic" contact, not physical contact.

Figure 5:
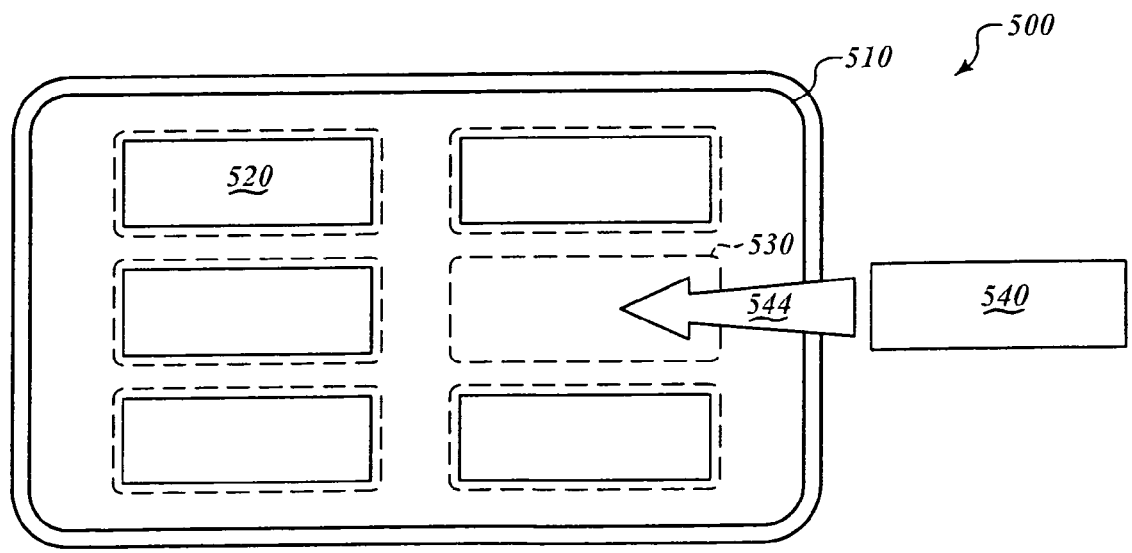
FIG. 5 schematically illustrates an exemplary modular nuclear fission fuel core.

Referring now to FIG. 5, a modular nuclear fission fuel core 500 includes a neutron reflector/radiation shield 510 and modular nuclear fission fuel assemblies 520. The modular nuclear fission fuel assemblies 520 are placed as desired within the fuel assembly receptacles 530.

The modular nuclear fission fuel core 500 may be operated in any number of ways. For example, all of the fuel assembly receptacles 530 in the modular nuclear fission fuel core 500 may be fully populated with modular nuclear fission fuel assemblies 520 prior to initial operation (e.g., prior to initial origination and propagation of a nuclear fission deflagration propagating wave burnfront within and through the modular nuclear fission fuel assemblies 520).

As another example, after a nuclear fission deflagration wave burnfront has completely propagated through modular nuclear fission fuel assemblies 520, such "burnt" modular nuclear fission fuel assemblies 520 may be removed from their respective fuel assembly receptacles 530 and replaced with unused modular nuclear fission fuel assemblies 540, as desired; this emplacement is indicated by the arrow 544. A nuclear fission deflagration wave burnfront can be initiated in the unused modular nuclear fission fuel assemblies 540, thereby enabling continued or extended operation of the modular nuclear fission fuel core 500 as desired.

As another example, the modular nuclear fission fuel core 500 need not be fully populated with modular nuclear fission fuel assemblies 520 prior to initial operation. For example, less than all of the fuel assembly receptacles 530 can be populated with modular nuclear fission fuel assemblies 520. In such a case, the number of modular nuclear fission fuel assemblies 520 that are placed within the modular nuclear fission fuel core 500 can be determined based upon power demand, such as electrical loading in watts, that will be placed upon the modular nuclear fission fuel core 500. A nuclear fission deflagration wave burnfront is originated and propagated through the modular nuclear fission fuel assemblies 520 as previously described.

In one approach, thermal management may be adjusted to provide thermal control appropriate to maintain the inserted fuel assembly receptacles 530 at appropriate temperatures.

As another example, the modular nuclear fission fuel core 500 again need not be fully populated with modular nuclear fission fuel assemblies 520 prior to initial operation. The number of modular nuclear fission fuel assemblies 520 provided may be determined based upon a number of modular nuclear fission fuel assemblies 520 that are available or for other reasons. A nuclear fission deflagration wave burnfront is originated and propagates through the modular nuclear fission fuel assemblies 520. As the nuclear fission deflagration wave burnfront approaches unpopulated fuel assembly receptacles 530, the unpopulated fuel assembly receptacles 530 can be populated with modular nuclear fission fuel assemblies 520, such as on a "just-in-time" basis; this emplacement is indicated by the arrow 544. Thus, continued or extended operation of the modular nuclear fission fuel core 500 can be enabled without initially fueling the entire modular nuclear fission fuel core 500 with modular nuclear fission fuel assemblies 520.

It will be appreciated that the concept of modularity can be extended. For example, in other embodiments, a modular nuclear fission reactor can be populated with any number of nuclear fission reactor cores in the same manner that the modular nuclear fission fuel core 500 can be populated with any number of modular nuclear fission fuel assemblies 520. To that end, the modular nuclear fission reactor can be analogized to the modular nuclear fission fuel core 500 and nuclear fission reactor cores can be analogized to the modular nuclear fission fuel assemblies 520. The several contemplated modes of operation discussed above for the modular nuclear fission fuel core 500 thus apply by analogy to a modular nuclear fission reactor.

Figure 6A:
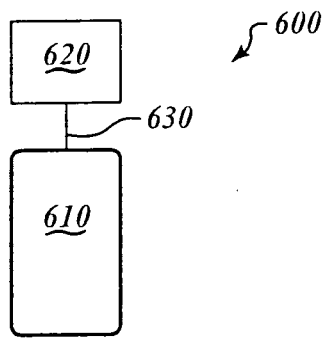
FIGS. 6A through 6C schematically illustrate an exemplary modular nuclear fission facility.
Figure 6B:
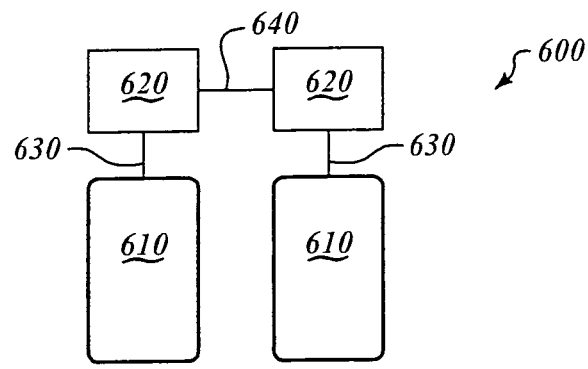
Figure 6C:
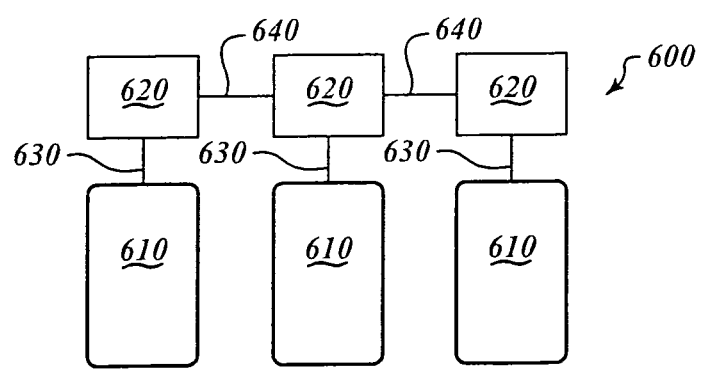

Applications of modular designs are shown in FIGS. 6A-6C. Referring to FIG. 6A, a nuclear fission facility 600 includes a fast neutron spectrum nuclear fission core assembly 610 that is operationally coupled to an operational sub system 620 (such as without limitation an electrical power generating facility) via a core-subsystem coupling 630 (such as without limitation a reactor coolant system such as a primary loop and, if desired, a secondary loop including a steam generator).

Referring now to FIG. 6B, another fast neutron spectrum nuclear fission core assembly 610 may be emplaced within the nuclear fission facility 600. The additional fast neutron spectrum nuclear fission core assembly 610 is operationally coupled to another operational sub system 620 by another core-subsystem coupling 630. The operational sub system's 620 are coupled to each other via a subsystem-subsystem coupling 640. A subsystem-subsystem coupling 640 can provide prime mover or other energy transfer medium between the operational sub systems 620. To that end, energy produced by any one of the nuclear core assemblies 610 can be transferred to any operational sub system 620 as desired.

Referring now to FIG. 6C, a third fast neutron spectrum nuclear fission core assembly 610, and associated operational sub system 620, and core-subsystem coupling 630 have been placed in the nuclear fission facility 600. Again, as described above, energy produced by any one of the fast neutron spectrum nuclear fission core assemblies 610 can be transferred to any operational sub system 620 as desired. In other embodiments, this linking process can be more general than discussed above, so that, the nuclear fission facility 600 may consist of a number N of fast neutron spectrum nuclear fission core assemblies 610, and a same or different number M of operational subsystems 620.

It will be appreciated that the individual fast neutron spectrum nuclear fission core assemblies 610 need not be identical to each other, nor need the operational sub systems 620 be identical to each other. Similarly, the core-subsystem couplings 630 need not be identical to each other, nor do the subsystem-subsystem couplings 640 need be identical to each other. In addition to the operational sub system 620 embodiment discussed above, other embodiments of operational sub system 620 include, without limitation, reactor coolant systems, electrical nuclear fission ignitors, afterlife heat-dumps, reactor site facilities (such as basing and security), and the like.

Figure 7:
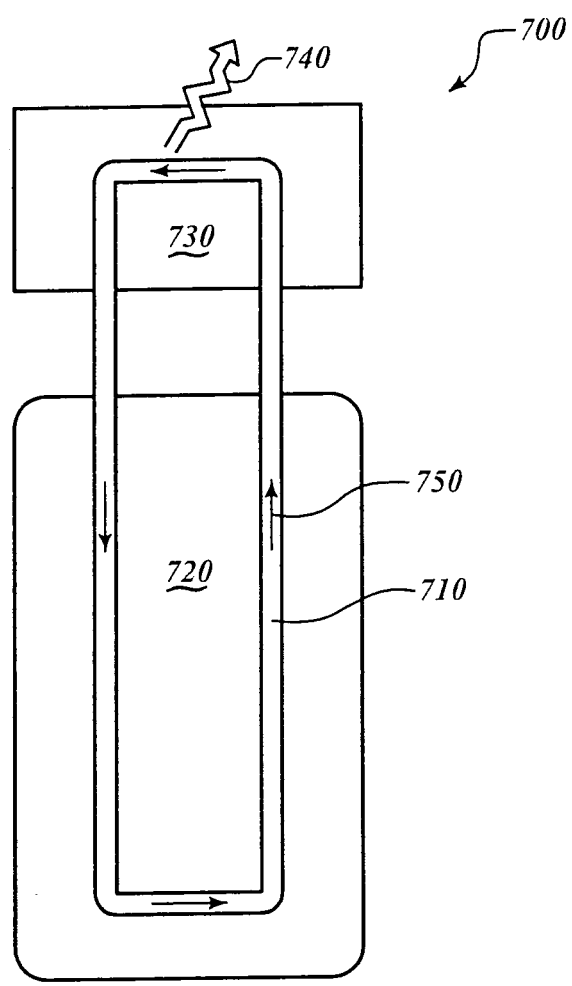
FIG. 7 schematically illustrates exemplary fast fluid cooling.

Referring now to FIG. 7, heat energy can be extracted from a nuclear fission reactor core according to another embodiment. In a nuclear fission reactor 700, a nuclear fission deflagration wave burnfront is initiated and propagated in a burning wavefront heat generating region 720, in a manner as described above. Heat absorbing material 710, such as a condensed phase density fluid (e.g., water, liquid metals, terphenyls, polyphenyls, fluorocarbons, FLIBE (2LiF—BeF2) and the like) flows through the region 720 as indicated by an arrow 750, and heat is transferred from the propagating burnfront fission to the heat absorbing material 710. In some fast fission spectrum nuclear reactors, the heat absorbing material 710 is chosen to be a nuclear inert material (such as He4) so as to minimally perturb the neutron spectrum. In some embodiments of the nuclear fission reactor 700, the neutron content is sufficiently robust, so that a non-nuclear-inert heat absorbing material 710 may be acceptably utilized. The heat absorbing material 710 flows to a heat extraction region 730 that is substantially out of thermal contact with the burning wavefront heat generating region 720. The energy 740 is extracted from the heat absorbing material 710 at the heat extraction region 730. The heat absorbing material 710 can reside in either a liquid state, a multiphase state, or a substantially gaseous state upon extraction of the heat energy 740 in the heat extraction region 730.

Figure 8:
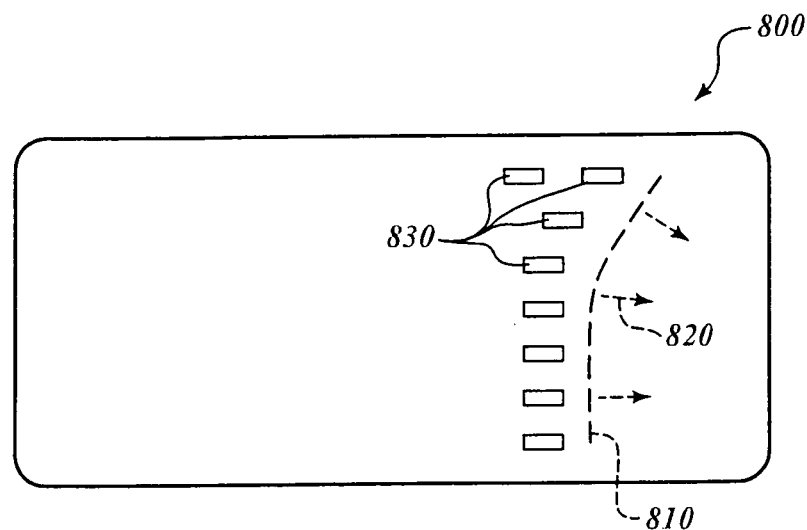
FIG. 8 schematically illustrates exemplary variable burn-up of nuclear fission fuel.

Referring now to FIG. 8, in some embodiments a nuclear fission deflagration wave burnfront can be driven into areas of nuclear fission fuel as desired, thereby enabling a variable nuclear fission fuel burn-up. In a propagating burnfront nuclear fission reactor 800, a nuclear fission deflagration wave burnfront 810 is initiated and propagated as described above. Actively controllable neutron modifying structures 830 can direct or move the burnfront 810 in directions indicated by arrows 820. In one embodiment, the actively controllable neutron modifying structures 830 insert neutron absorbers, such as without limitation Li6, B10, or Gd, into nuclear fission fuel behind the burnfront 810, thereby driving down or lowering neutronic reactivity of fuel that is presently being burned by the burnfront 810 relative to neutronic reactivity of fuel ahead of the burnfront 810, thereby speeding up the propagation rate of the nuclear fission deflagration wave. In another embodiment, the actively controllable neutron modifying structures 830 insert neutron absorbers into nuclear fission fuel ahead of the burnfront 810, thereby slowing down the propagation of the nuclear fission deflagration wave. In other embodiments the actively controllable neutron modifying structures 830 insert neutron absorbers into nuclear fission fuel within or to the side of the burnfront 810, thereby changing the effective size of the burnfront 810.

In another embodiment, the actively controllable neutron modifying structures 830 insert neutron moderators, such as without limitation hydrocarbons or Li7, thereby modifying the neutron energy spectrum, and thereby changing the neutronic reactivity of nuclear fission fuel that is presently being burned by the burnfront 810 relative to neutronic reactivity of nuclear fission fuel ahead of or behind the burnfront 810. In some situations, an effect of the neutron moderators is associated with detailed changes in the neutron energy spectrum (e.g., hitting or missing cross-section resonances), while in other cases the effects are associated with lowering the mean neutron energy of the neutron environment (e.g., downshifting from "fast" neutron energies to epithermal or thermal neutron energies). In yet other situations, an effect of the neutron moderators is to deflect neutrons to or away from selected locations. In some embodiments, one of the aforementioned effects of neutron moderators is of primary importance, while in other embodiments, multiple effects are of comparable design significance. In another embodiment, the actively controllable neutron modifying structures 830 contain both neutron absorbers and neutron moderators. In one nonlimiting example, the location of neutron absorbing material relative to that of neutron moderating material is changed to affect control (e.g., by masking or unmasking absorbers, or by spectral-shifting to increase or decrease the absorption by absorbers). In another nonlimiting example, control is affected by changing the amounts of neutron absorbing material and/or neutron moderating material.

The burnfront 810 can be directed as desired according to selected propagation parameters. For example, propagation parameters can include a propagation direction or orientation of the burnfront 810, a propagation rate of the burnfront 810, power demand parameters such as the heat generation density, cross-sectional dimensions of a burning region through which the burnfront 810 is to the propagated (such as an axial or lateral dimension of the burning region relative to an axis of propagation of the burnfront 810), or the like. For example, the propagation parameters may be selected so as to control the spatial or temporal location of the burnfront 810, so as to avoid failed or malfunctioning control elements (e.g., neutron modifying structures or thermostats), or the like.

Figure 9A:
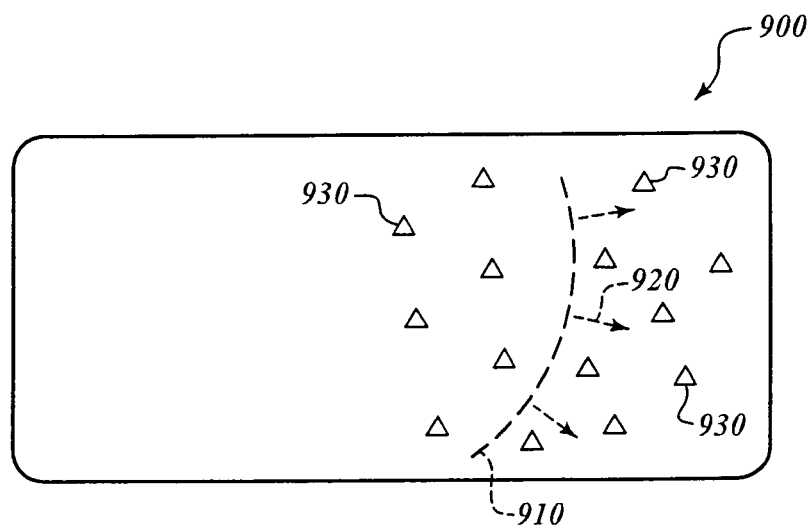
FIG. 9A schematically illustrates exemplary programmable thermostating of nuclear fission fuel.
Figure 9B:
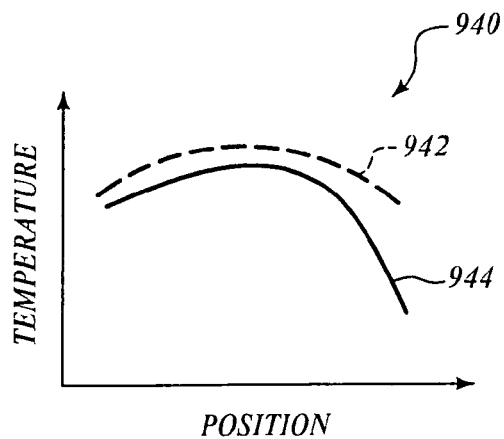
FIG. 9B plots operating temperature profiles.

Referring now to FIGS. 9A and 9B, a nuclear fission reactor can be controlled with programmable thermostats, thereby enabling the temperature of the reactor's fuel-charge to be varied over time responsive to changes in operating parameters.

Temperature profiles 940 are determined as a function of position through a fuel-charge of a nuclear fission reactor 900. An operating temperature profile 942 of operating temperatures throughout the nuclear fission reactor 900 is established responsive to a first set of operating parameters, such as predicted power draw, thermal creep of structural materials, etc. At other times, or in other circumstances, the operating parameters may be revised. To that end, a revised operating temperature profile 944 of revised operating temperatures throughout the nuclear fission reactor 900 is established.

The nuclear fission reactor 900 includes programmable temperature responsive neutron modifying structures 930. The programmable temperature responsive neutron modifying structures 930 (an example of which is described in detail later) introduce and remove neutron absorbing or neutron moderating material into and from the fuel-charge of a nuclear fission reactor 900. A nuclear fission deflagration wave burnfront 910 is initiated and propagated in a fuel-charge of the nuclear fission reactor 900. Responsive to the revised operating temperature profile 944, the programmable temperature responsive neutron modifying structures 930 introduce neutron absorbing or moderating material into the fuel-charge of the nuclear fission reactor 900 to lower operating temperature in the nuclear fission reactor 900 or remove neutron absorbing or moderating material from the fuel-charge of the nuclear fission reactor 900 in order to raise operating temperature of the nuclear fission reactor 900.

It will be appreciated that operating temperature profiles are only one example of control parameters which can be used to determine the control settings of programmable temperature responsive neutron modifying structures 930, which are in such cases responsive to the selected control parameters, not necessarily to the temperature. Nonlimiting examples of other control parameters which can be used to determine the control settings of programmable temperature responsive neutron modifying structures 930 include power levels, neutron levels, neutron spectrum, neutron absorption, fuel burnup levels, and the like. In one example, the neutron modifying structures 930 are used to control fuel burnup levels to relatively low (e.g., <50%) levels in order to achieve high-rate "breeding" of nuclear fission fuel for use in other nuclear fission reactors, or to enhance suitability of the burnt nuclear fission fuel for subsequent re-propagation of a nuclear fission deflagration wave in a propagating nuclear fission deflagration wave reactor. Different control parameters can be used at different times, or in different portions of the reactor. It will be appreciated that the various neutron modifying methods discussed previously in the context of neutron modifying structures can also be utilized in programmable temperature responsive neutron modifying structures 930, including without limitation, the use of neutron absorbers, neutron moderators, combinations of neutron absorbers and/or neutron moderators, variable geometry neutron modifiers, and the like.

Figure 10A:
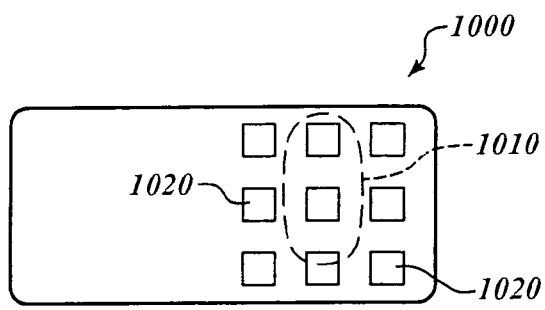
FIGS. 10A and 10B schematically illustrate exemplary nuclear irradiation of material.
Figure 10B:
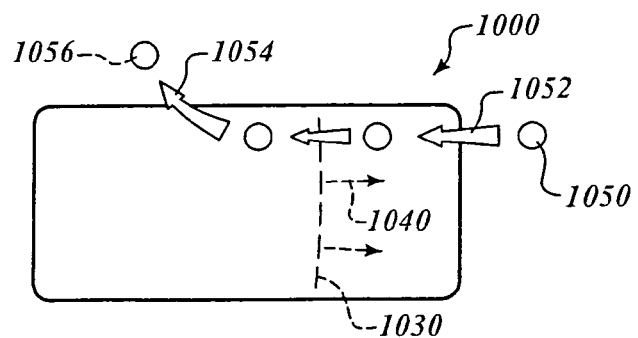

According to other embodiments and referring now to FIGS. 10A and 10B, material can be nuclearly processed. As shown in FIG. 10A, nuclearly processable material 1020 (that has a set of non-irradiated properties) is placed in a propagating nuclear fission deflagration wave reactor 1000. A nuclear fission deflagration wave propagating burnfront 1030 is originated and propagated along a direction indicated by arrows 1040 as described above. The material 1020 is placed in neutronic coupling with a region of maximized reactivity 1010, that is the material is neutron irradiated, as the nuclear fission deflagration wave propagating burnfront 1030 propagates through or in the vicinity of the material 1020, thereby irradiating the material 1020 and conferring upon the material 1020 a desired set of modified properties.

In one embodiment, the neutron irradiation of material 1020 may be controlled by the duration and/or extent of the nuclear fission deflagration wave propagating burnfront 1030. In another embodiment, the neutron irradiation of material 1020 may be controlled by control of the neutron environment (e.g., the neutron energy spectrum for Np237 processing) via neutron modifying structures. In another embodiment, the propagating nuclear fission deflagration wave reactor 1000 may be operated in a "safe" sub-critical manner, relying upon an external source of neutrons to sustain the propagating burnfront 1030, while using a portion of the fission-generated neutrons for nuclear processing of the material 1020. In some embodiments, the material 1020 may be present before nuclear fission ignition occurs within the propagating nuclear fission deflagration wave reactor 1000, while in other embodiments the material 1020 may be added after nuclear fission ignition. In some embodiments, the material 1020 is removed from the propagating nuclear fission deflagration wave reactor 1000, while in other embodiments it remains in place.

Alternately and as shown in FIG. 10B, a nuclear fission deflagration wave propagating burnfront 1030 is initiated and propagated in a propagating nuclear fission deflagration wave reactor 1000 along a direction indicated by arrows 1040. Material 1050 having a set of non-irradiated properties is loaded into the propagating nuclear fission deflagration wave reactor 1000. As indicated generally at 1052, the material 1050 is transported into physical proximity and neutronic coupling with a region of maximized reactivity as the nuclear fission deflagration wave propagating burnfront 1030 passes through the material 1050. The material 1050 remains in neutronic coupling for a sufficient time interval to convert the material 1050 into material 1056 having a desired set of modified properties. Upon the material 1050 having thus been converted into the material 1056, the material 1056 may be physically transported out of the reactor 1000 as generally indicated at 1054. The removal 1054 can take place either during operation of the propagating nuclear fission deflagration wave reactor 1000 or afterward it has been "shut-off", and can be performed in either a continuous, sequential, or batch process. In one example, the nuclearly processed material 1056 may be subsequently used as nuclear fission fuel in another nuclear fission reactor, such as without limitation LWRs or propagating nuclear fission deflagration wave reactors. In another nonlimiting example, the nuclearly processed material 1056 may be subsequently used within the nuclear fission ignitor of a propagating nuclear fission deflagration wave reactor. In one approach, thermal management may be adjusted to provide thermal control appropriate for any changes in operational parameters, as appropriate for the revised materials or structures.

Figure 11A:
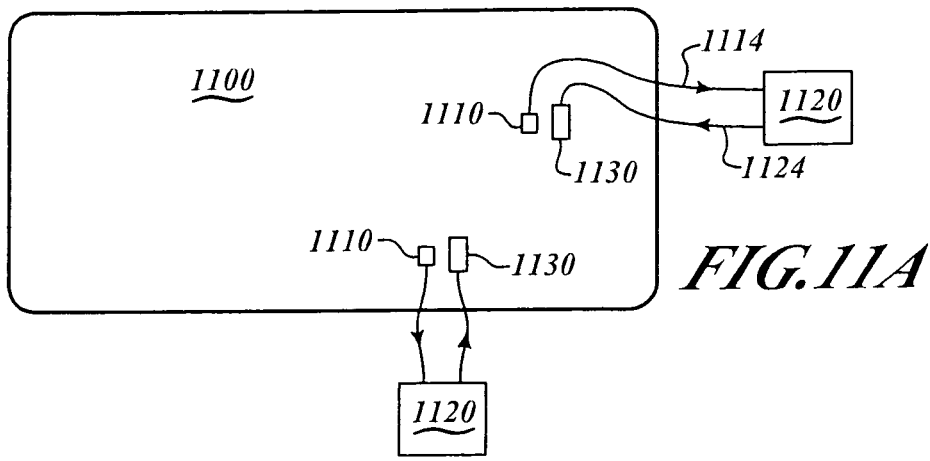
FIGS. 11A through 11C schematically illustrate exemplary temperature control of nuclear reactivity.

According to further embodiments, temperature-driven neutron absorption can be used to control a nuclear fission reactor, thereby "engineering-in" an inherently-stable negative temperature coefficient of reactivity ($\alpha$T). Referring now to FIG. 11A, a nuclear fission reactor 1100 is instrumented with temperature detectors 1110, such as without limitation thermocouples. In this embodiment, the nuclear fission reactor 1100 suitably can be any type of nuclear fission reactor whatsoever. To that end, the nuclear fission reactor 1100 can be a thermal neutron spectrum nuclear fission reactor or a fast neutron spectrum nuclear fission reactor, as desired for a particular application.

The temperature detectors detect local temperature in the nuclear fission reactor 1100 and generate a signal 1114 indicative of a detected local temperature. The signal 1114 is transmitted to a control system 1120 in any acceptable manner, such as without limitation, fluid coupling, electrical coupling, optical coupling, radiofrequency transmission, acoustic coupling, magnetic coupling, or the like.

Responsive to the signal 1114 indicative of the detected local temperature, the control system 1120 determines an appropriate correction (positive or negative) to local neutronic reactivity in the nuclear fission reactor 1100 to return the nuclear fission reactor 1100 to desired operating parameters (such as desired local temperatures for full reactor power). To that end, the control system 1120 generates a control signal 1124 indicative of a desired correction to local neutronic reactivity.

The control signal 1124 is transmitted to a dispenser 1130 of neutron absorbing material. The signal 1124 suitably is transmitted in the same manner as the signal 1114. The neutron absorbing material suitably is any neutron absorbing material as desired for a particular application, such as without limitation Li6, B10, or Gd. The dispenser 1130 suitably is any reservoir and dispensing mechanism acceptable for a desired application, and may, for example, have the reservoir located remotely (e.g., outside the neutron reflector of the nuclear fission reactor 1100) from the dispensing mechanism 1130. The dispenser 1130 dispenses the neutron absorbing material within the nuclear fission reactor core responsive to the control signal 1124, thereby altering the local neutronic reactivity.

Figure 11B:
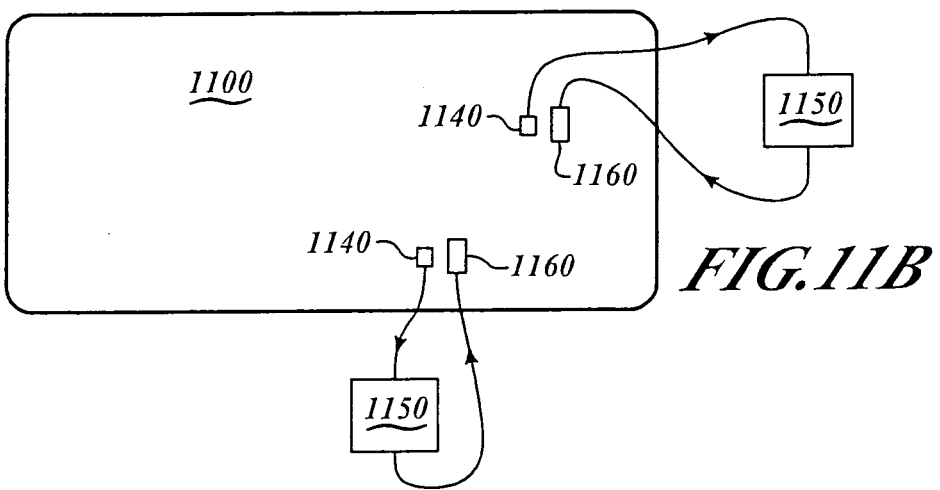

Referring now to FIG. 11B and given by way of non-limiting example, exemplary thermal control may be established with a neutron absorbing fluid. A thermally coupled fluid containing structure 1140 contains a fluid in thermal communication with a local region of the nuclear fission reactor 1100. The fluid in the structure 1140 expands or contracts responsive to local temperature fluctuations. Expansion and/or contraction of the fluid is operatively communicated to a force coupling structure 1150, such as without limitation a piston, located external to the nuclear fission reactor 1100. A resultant force communicated by the force coupling structure 1150 is exerted on neutron absorbing fluid in a neutron absorbing fluid containing structure 1160. The neutron absorbing fluid is dispensed accordingly from the structure 1160, thereby altering the local neutronic reactivity. In another example, a neutron moderating fluid may be used instead of, or in addition to, the neutron absorbing fluid. The neutron moderating fluid chances the neutron energy spectrum and lowers the mean neutron energy of the local neutron environment, thereby driving down or lowering neutronic reactivity of nuclear fission fuel within the nuclear fission reactor 1100. In another example, the neutron absorbing fluid and/or the neutron modifying fluid may have a multiple phase composition (e.g., solid pellets within a liquid).

Figure 11C:
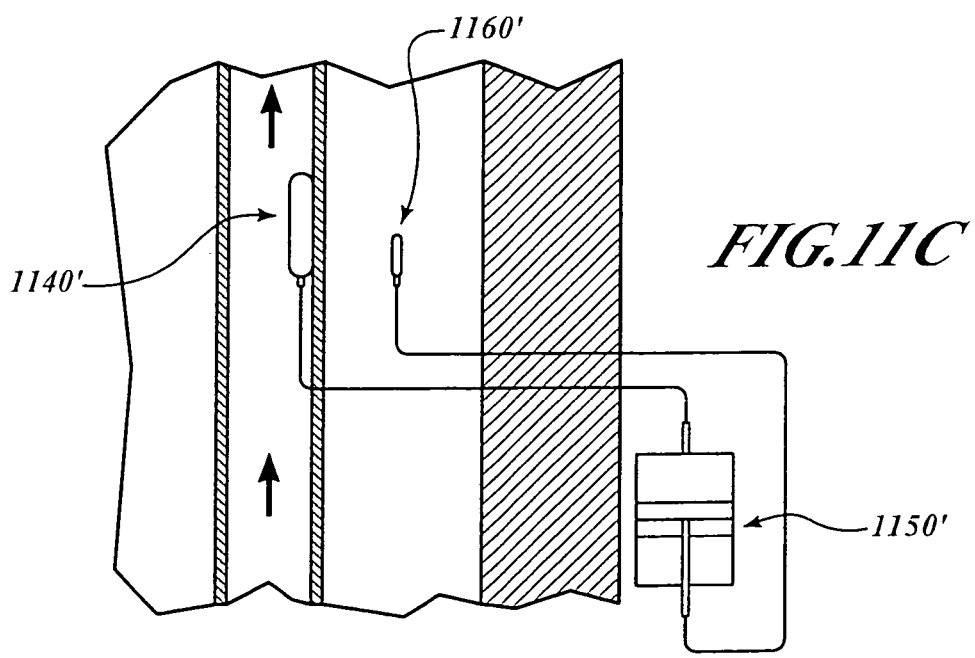

FIG. 11C illustrates details of an exemplary implementation of the arrangement shown in FIG. 11B. Referring now to FIG. 11C, fuel power density in a nuclear fission reactor 1100' is continuously regulated by the collective action of a distributed set of independently-acting thermostating modules, over very large variations in neutron flux, significant variations in neutron spectrum, large changes in fuel composition and order-of-magnitude changes in power demand on the reactor. This action provides a large negative temperature coefficient of reactivity just above the design-temperature of the nuclear fission reactor 1100'.

Located throughout the fuel-charge in the nuclear fission reactor 1100' in a 3-D lattice (which can form either a uniform or a non-uniform array) whose local spacing is roughly a mean free path of a median-energy-for-fission neutron (or may be reduced for redundancy purposes), each of these modules includes a pair of compartments 1140' and 1160', each one of which is fed by a capillary tube. The small thermostat-bulb compartment 1160' located in the nuclear fission fuel contains a thermally sensitive material, such as without limitation, $Li^7$, whose neutron absorption cross-section may be low for neutron energies of interest, while the relatively large compartment 1140' positioned in a different location (e.g., on the wall of a coolant tube) may contain variable amounts of a neutron absorbing material, such as without limitation, $Li^6$, which has a comparatively large neutron absorption cross-section. Lithium melts at 453 K and 1-bar-boils at 1615 K, and therefore is a liquid across typical operating temperature ranges of the nuclear fission reactor 1100'. As the fuel temperature rises, the thermally sensitive material contained in the thermostat-bulb 1160' expands, and a small fraction of it is expelled (approximately $10^{-3}$, for a 100K temperature change in $Li^7$), potentially under kilobar pressure, into the capillary tube which terminates on the bottom of a cylinder-and-piston assembly 1150' located remotely (e.g., outside of the radiation shield) and physically lower than the neutron absorbing material's intra-core compartment 1140' (in the event that gravitational forces are to be utilized). There the modest volume of high-pressure thermally sensitive material drives a swept-volume-multiplying piston in the assembly 1150' which pushes a potentially three order-of-magnitude larger volume of neutron absorbing material through a core-threading capillary tube into an intra-core compartment proximate to the thermostat-bulb which is driving the flow. There the neutron absorbing material, whose spatial configuration is immaterial as long as its smallest dimension is less than a neutron mean free path, acts to absorptively depress the local neutron flux, thereby reducing the local fuel power density. When the local fuel temperature drops, neutron absorbing material returns to the cylinder-and-piston assembly 1150' (e.g., under action of a gravitational pressure-head), thereby returning the thermally sensitive material to the thermostat-bulb 1160' whose now-lower thermomechanical pressure permits it to be received.

It will be appreciated that operation of thermostating modules does not rely upon the specific fluids (Li6 and Li7) discussed in the above exemplary implementation. In one exemplary embodiment, the thermally sensitive material may be chemically, not just isotopically, different from the neutron absorbing material. In another exemplary embodiment, the thermally sensitive material may be isotopically the same as the neutron absorbing material, with the differential neutron absorbing properties due to a difference in volume of neutronically exposed material, not a difference in material composition.

Figure 12:
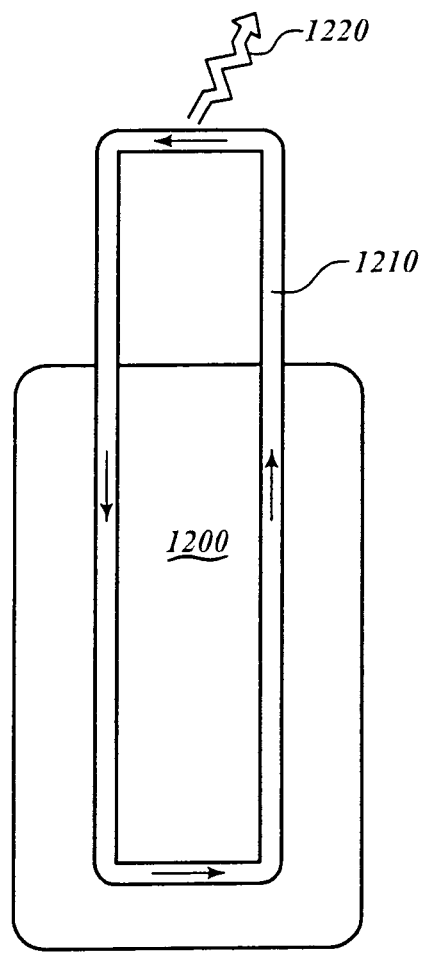
FIG. 12 schematically illustrates an exemplary low-coolant-temperature nuclear fission reactor.

Referring now to FIG. 12, in another embodiment a propagating nuclear fission deflagration wave reactor 1200 operates at core temperatures significantly lower than core temperatures of nuclear fission reactors of other embodiments. While nuclear fission reactors of other embodiments may operate at core temperatures in the order of around 1,000 K or so, (e.g., to enhance electrical power conversion efficiency) the propagating nuclear fission deflagration wave reactor 1200 operates at core temperatures of less than around 550 K, and some embodiments operate at core temperatures of between around 400 K and around 500 K. Reactor coolant 1210 transfers heat from nuclear fission in the propagating nuclear fission deflagration wave reactor 1200. In turn thermal energy 1220 is transferred from the reactor coolant 1210 to a thermally driven application. Given by way of non-limiting examples, exemplary thermally driven applications include desalinating seawater, processing biomass into ethanol, space-heating, and the like. In another embodiment, a propagating nuclear fission deflagration wave reactor 1200 may operate at core temperatures above 550 K, and utilize thermal energy 1220 from the reactor coolant 1210 for thermally driven applications instead of, or in addition to, electrical power generation applications. Given by way of non-limiting examples, exemplary thermally driven applications include thermolysis of water, thermal hydrocarbon processing, and the like.

Figure 13:
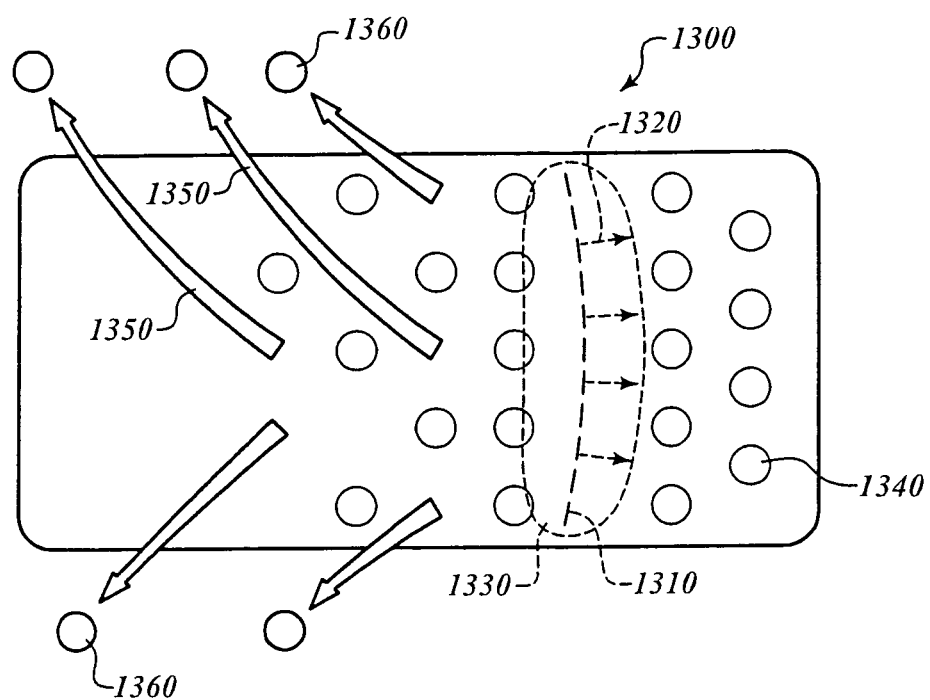
FIG. 13 schematically illustrates exemplary removal of nuclear fission fuel.

Referring now to FIG. 13, in another embodiment nuclear fission fuel can be removed after it has been burned. A nuclear fission deflagration wave propagating burnfront 1310 is initiated and propagated in a modular nuclear fission reactor core 1300 along a direction indicated by arrows 1320 toward modules 1340 of nuclear fission fuel material, thereby establishing a region 1330 of maximized reactivity as discussed above. As discussed above, the modules 1340 of nuclear fission fuel material may be considered "burnt" after the propagating burnfront 1310 has propagated the region 1330 of maximized reactivity through the module 1340 of nuclear fission fuel material. That is, the modules 1340 of nuclear fission fuel material "behind" the region 1330 of maximized reactivity may be considered "burnt". Any desired number of the "burnt" modules 1340 of nuclear fission fuel material (behind the region 1330 of maximized reactivity) are removed, as generally indicated at 1350. As generally indicated at 1360, nuclear fission fuel material has been removed from the nuclear fission reactor core 1300.

Figure 14A:
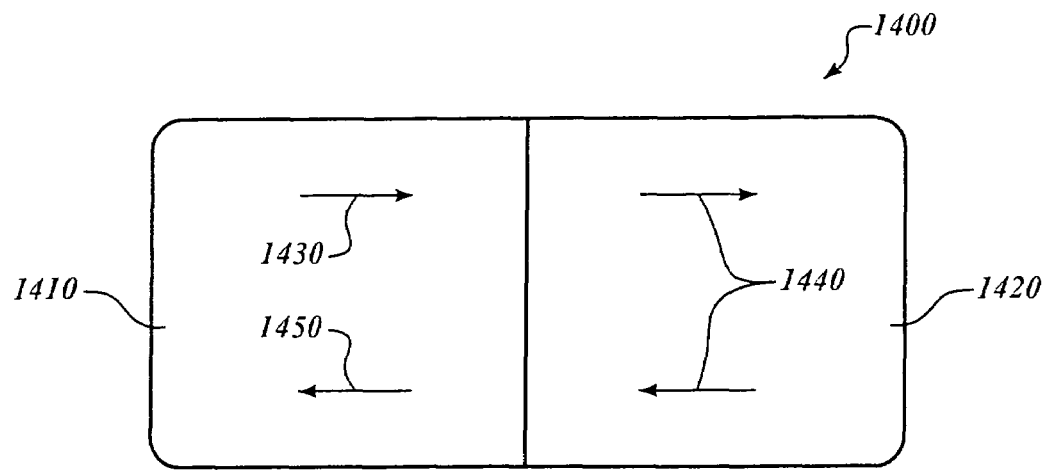
FIGS. 14A and 14B schematically illustrate exemplary re-propagation of a nuclear fission deflagration wave.
Figure 14B:
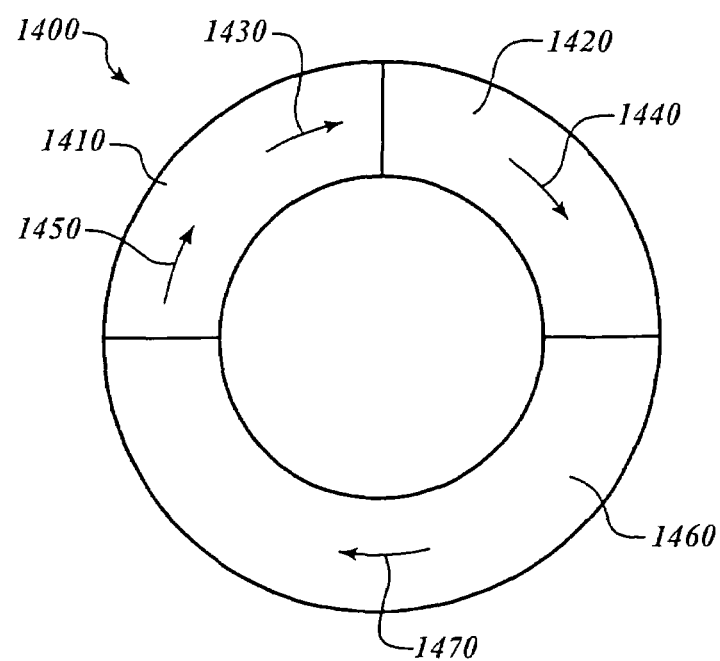

Referring now to FIGS. 14A and 14B, according to other embodiments nuclear fission fuel can be re-burned in place without reprocessing. As shown in FIG. 14A, a propagating nuclear fission deflagration wave reactor 1400 includes regions 1410 and 1420. A nuclear fission deflagration wave burnfront 1430 is initiated and propagated through the region 1410 toward the region 1420. The nuclear fission deflagration wave burnfront 1430 propagates through the region 1420 as a nuclear fission deflagration wave burnfront 1440. After the nuclear fission deflagration wave burnfront 1440 propagates into region 1420, and either before or after it reaches an end of the propagating nuclear fission deflagration wave reactor 1400, the nuclear fission deflagration wave burnfront 1440 is redirected or re-initiated and retraces a path of propagation away from the end of the propagating nuclear fission deflagration wave reactor 1400 back toward the region 1410. The nuclear fission deflagration wave burnfront 1440 propagates through the region 1410 as a nuclear fission deflagration wave burnfront 1450 away from the region 1420 toward an end of the propagating nuclear fission deflagration wave reactor 1400. The nuclear fission fuel in regions 1410 and 1420 is different during the repropagation of nuclear fission deflagration wave burnfronts 1440 and 1450 than it was during the previous propagation of nuclear fission deflagration wave burnfronts 1430 and 1440, due to changes in the amounts of fissile isotopes and the amounts of fission product "ash". The neutron environment may differ during propagation and repropagation due to the above differences in the nuclear fission fuel, as well as other factors, such as without limitation, possible changes in the control of neutron modifying structures, thermal heat extraction levels, or the like.

As shown in FIG. 14B (and as briefly mentioned in reference to FIG. 3C), the geometry of an embodiment of the propagating nuclear fission deflagration wave reactor 1400 forms a closed loop, such as an approximately toroidal shape. In this exemplary embodiment, the propagating nuclear fission deflagration wave reactor 1400 includes the regions 1410 and 1420 and a third region 1460 different from the regions 1410 and 1420. The nuclear fission deflagration wave burnfront 1430 is initiated and propagated through the region 1410 toward the region 1420. The nuclear fission deflagration wave burnfront 1430 propagates through the region 1420 as the nuclear fission deflagration wave burnfront 1440. The nuclear fission deflagration wave burnfront 1440 propagates through the region 1460 as a nuclear fission deflagration wave burnfront 1470.

When the nuclear fission deflagration wave burnfronts 1430, 1440, and 1470 have propagated completely through the regions 1410, 1420, and 1460, respectively, nuclear fission fuel material in the regions 1410, 1420, and 1460 can be considered "burnt". After the nuclear fission fuel material has been burnt, the nuclear fission deflagration wave burnfront 1430 is re-initiated and propagates through the region 1410 as a nuclear fission deflagration wave burnfront 1450. The re-initiation in region 1410 may occur without limitation, through the action of a nuclear fission igniter, such as discussed earlier, or may occur as a result of the decay and/or removal of nuclear fission products from the nuclear fission fuel material in region 1410, or may occur as the result of other sources of neutrons or fissile material, or may occur due to control of neutron modifying structures, as discussed previously.

In another exemplary embodiment, the nuclear fission deflagration wave may potentially propagate in a plurality of directions. One or more propagation paths may be established, and may thereafter split into one or more separate propagation paths. The splitting of propagation paths may be accomplished without limitation by such methods as the configuration of the nuclear fission fuel material, the action of neutron modifying structures as discussed earlier, or the like. Propagation paths may be distinct, or may be reentrant. Nuclear fission fuel material may be burnt once, never, or multiple times. Repropagation of a nuclear fission deflagration wave multiple times through a region of nuclear fission fuel material may involve either the same or a different propagation direction.

While some of the embodiments described previously illustrate nuclear fission fuel cores of substantially constant chemical and/or isotropic materials, in some approaches nuclear fission fuel cores of nonuniform material may be used. For example, in some approaches nuclear fission fuel cores may include regions having different percentages of uranium and thorium. In other approaches, nuclear fission fuel cores may include regions of different actinide or transuranic isotopes, such as without limitation different isotopes of thorium or different isotopes of uranium. In addition, mixtures of such different combinations may also be appropriate. For example, mixtures of thorium and of different uranium isotope ratios may provide different burning rates, temperatures, propagation features, localization, or other features. In other approaches, the nuclear fission fuel cores may include mixtures of "breedable" isotopes (such as Th232 or U238) along with other fissionable actinide or transuranic elements, such as without limitation, uranium, plutonium, americium, or the like. Additionally, such variations in chemicals, isotopes, cross sections, densities, or other aspects of the fuel or may vary radially, axially or in a variety of other spatial manners. For example, such variations may be defined according to anticipated variations in energy demand, aging, or other anticipated variations. In one aspect, where growth of energy demand in a region would be reasonably anticipated, it may be useful to define the fuel or materials to correlate to an expected increased demand of the region.

In still another aspect, such variations may be implemented according to other approaches described herein. For example, the variations may be defined after initiation of burning using the modular approach described herein or the multipath approaches described herein. In other approaches, movement of portions of the material may produce the appropriate material concentrations, positioning, ratios, or other characteristics.

While the embodiments above have illustrated propagating nuclear fission deflagration wavefronts in fixed or variable fuel cores, in one aspect, propagating nuclear fission deflagration wavefronts may remain substantially spatially fixed while the fuel core or portions of the fuel core move relative to the wavefront. In one such approach, movement of the nuclear fission fuel core to maintain substantially localized positioning of the propagating nuclear fission deflagration wavefront can stabilize, optimize, or otherwise control thermal coupling to a cooling or heat transfer system. Or, in another aspect, controlled positioning of the propagating nuclear fission deflagration wavefront by physically displacing the nuclear fission fuel can simplify or reduce constraints upon other aspects of the nuclear fission reactor, such as the cooling system, neutron shielding, or other aspects of neutron density control.

While a number of exemplary embodiments and aspects have been illustrated and discussed above, those of skill in the art will recognize certain modifications, permutations, additions, and sub-combinations thereof It is therefore intended that the following appended claims and claims hereafter introduced are interpreted to include all such modifications, permutations, additions, and sub-combinations as are within their true spirit and scope.

What is claimed is:

1. A nuclear fission fuel structure for propagating a nuclear fission deflagration wave, the nuclear fission fuel structure comprising:
    a plurality of non-contiguous segments of previously-burned nuclear fission fuel material inserted into a core of a nuclear fission deflagration wave reactor; and
    a nuclear fission igniter module disposed in the core of the nuclear fission deflagration wave reactor to initiate a propagating nuclear fission deflagration wave in the previously-burned nuclear fission fuel material, the nuclear fission igniter module including a source of protons and an intermediate material configured to receive the protons from the source of protons and further configured to provide fast-fission neutrons to the previously-burned nuclear fission fuel material.

2. The nuclear fission fuel structure of claim 1, wherein the intermediate material provides the fast-fission neutrons by a process chosen from electro-fission of elements and photo-fission of elements.

3. The nuclear fission fuel structure of claim 1, wherein the source of protons includes a linear particle accelerator.

* * * * *